US010774744B2

(12) United States Patent
Kline

(10) Patent No.: US 10,774,744 B2
(45) Date of Patent: *Sep. 15, 2020

(54) JET ENGINE WITH DEFLECTOR

(71) Applicant: Michael J. Kline, Corona Del Mar, CA (US)

(72) Inventor: Michael J. Kline, Corona Del Mar, CA (US)

(*) Notice: Subject to any disclaimer, the term of this patent is extended or adjusted under 35 U.S.C. 154(b) by 235 days.

This patent is subject to a terminal disclaimer.

(21) Appl. No.: 16/036,497

(22) Filed: Jul. 16, 2018

(65) Prior Publication Data
US 2019/0010867 A1 Jan. 10, 2019

Related U.S. Application Data

(63) Continuation of application No. 14/594,747, filed on Jan. 12, 2015, now Pat. No. 10,024,237, which is a
(Continued)

(51) Int. Cl.
| | | |
|---|---|---|
| *B01D 39/00* | (2006.01) | |
| *F02C 7/055* | (2006.01) | |
| *B64D 29/00* | (2006.01) | |
| *F02C 7/05* | (2006.01) | |
| *B29C 45/00* | (2006.01) | |
| *C08F 120/56* | (2006.01) | |
| *C04B 41/52* | (2006.01) | |
| *F01D 9/02* | (2006.01) | |

(Continued)

(52) U.S. Cl.
CPC .......... *F02C 7/055* (2013.01); *B29C 45/0003* (2013.01); *B64D 29/00* (2013.01); *F02C 7/05* (2013.01); *B29L 2031/3076* (2013.01); *C04B 41/52* (2013.01); *C08F 8/12* (2013.01); *C08F 120/56* (2013.01); *F01D 9/02* (2013.01); *F01D 9/041* (2013.01); *F05D 2250/15* (2013.01); *F05D 2250/25* (2013.01); *Y02T 50/672* (2013.01); *Y10T 137/0536* (2015.04)

(58) Field of Classification Search
CPC .. F02C 7/055; F02C 7/052; F02C 7/05; B29C 45/0003; B64D 33/02; B64D 2033/022; B64D 29/00; B29L 2031/3076; Y10T 137/0536; F05D 2250/25; F05D 2250/15; Y02T 50/672; B01D 2279/60
See application file for complete search history.

(56) References Cited

U.S. PATENT DOCUMENTS

| | | | | |
|---|---|---|---|---|
| 2,553,512 A | * | 5/1951 | Cotton, Jr. | ............... F02C 7/055 55/306 |
| 2,704,136 A | * | 3/1955 | Rainbow | ................. F02C 7/055 55/306 |

(Continued)

FOREIGN PATENT DOCUMENTS

EP 1841212 A1 10/2007

*Primary Examiner* — Dung H Bui
(74) *Attorney, Agent, or Firm* — BakerHostetler

(57) ABSTRACT

An air inlet deflector for a structure having an air inlet. The deflector may be retractable within the structure, may be integrally formed with the structure, and may prevent the structure from ingesting foreign matter, such as birds. The deflector may include a series of ribs, spokes, or vanes that may vary in width and/or thickness from fore to aft, and/or may be curvilinear in one or more planes of view, and/or may serve double duty as inlet vanes for redirecting inlet air.

18 Claims, 14 Drawing Sheets

Related U.S. Application Data continuation of application No. 13/888,897, filed on May 7, 2013, now Pat. No. 8,968,437, which is a continuation-in-part of application No. 13/462,181, filed on May 2, 2012, now Pat. No. 8,657,895.

(51) Int. Cl.
*C08F 8/12* (2006.01)
*F01D 9/04* (2006.01)
*B29L 31/30* (2006.01)

(56) References Cited

U.S. PATENT DOCUMENTS

| | | | | |
|---|---|---|---|---|
| 2,709,499 A * | 5/1955 | Bell | ................ | F02C 7/055 55/306 |
| 2,928,497 A * | 3/1960 | Stockdale | ................ | F02C 7/055 55/306 |
| 2,944,631 A * | 7/1960 | Kerry | ................ | B64D 33/02 55/306 |
| 3,109,610 A * | 11/1963 | Quenzler | ................ | F02C 7/05 244/15 |
| 3,121,545 A | 2/1964 | Meletiou | | |
| 3,196,598 A * | 7/1965 | Olson | ................ | B64D 33/02 55/306 |
| 3,500,738 A * | 3/1970 | Wenig | ................ | F24F 1/0071 454/202 |
| 3,871,844 A | 3/1975 | Calvin, Sr. | | |
| 3,998,048 A * | 12/1976 | Derue | ................ | B64D 33/02 60/39.092 |
| 4,149,689 A | 4/1979 | McDonald | | |
| 4,354,346 A | 10/1982 | Wooding | | |
| 5,147,658 A * | 9/1992 | Furukawa | ................ | B22D 17/2076 425/127 |
| 5,411,224 A | 5/1995 | Dearman et al. | | |
| 5,419,682 A | 5/1995 | Martin | | |
| 5,482,433 A * | 1/1996 | Norris | ................ | F01D 5/22 415/173.7 |
| 5,549,259 A | 8/1996 | Herlik | | |
| 5,672,417 A * | 9/1997 | Champenois | ................ | F01D 5/282 416/230 |
| D433,029 S | 10/2000 | Eidson | | |
| 6,138,950 A | 10/2000 | Wainfan et al. | | |
| 6,193,011 B1 | 2/2001 | Harris | | |
| 6,244,817 B1 * | 6/2001 | Ngo | ................ | B63H 1/16 415/119 |
| 6,289,815 B1 | 9/2001 | Tougeron et al. | | |
| 6,598,384 B1 | 7/2003 | Adkins | | |
| D614,560 S | 4/2010 | Alexander | | |
| 7,691,162 B2 | 4/2010 | McCahill et al. | | |
| D621,852 S | 8/2010 | Zunik | | |
| 7,803,204 B1 | 9/2010 | Mladinich | | |
| 7,854,778 B2 * | 12/2010 | Groom | ................ | B64D 33/02 55/306 |
| D631,420 S | 1/2011 | Locklear | | |
| 7,871,455 B1 | 1/2011 | Sands et al. | | |
| 7,887,610 B2 | 2/2011 | Pavlatos | | |
| 7,927,404 B2 | 4/2011 | Kemoun | | |
| 8,052,083 B1 | 11/2011 | Moran | | |
| 8,052,767 B2 * | 11/2011 | Sands | ................ | B64D 33/02 244/53 B |
| 8,117,820 B1 | 2/2012 | Briscoe | | |
| 8,285,136 B2 | 10/2012 | Tsujiyama | | |
| 8,419,815 B1 * | 4/2013 | Moran | ................ | B64D 33/02 244/53 B |
| 8,429,890 B2 * | 4/2013 | Matos | ................ | B64D 33/02 137/15.1 |
| 8,516,785 B2 * | 8/2013 | Brown | ................ | B64D 33/02 137/15.1 |
| 8,528,864 B2 * | 9/2013 | Villanueva Montero | ................ | F41H 5/06 244/129.1 |
| 2003/0033795 A1 | 2/2003 | Lo | | |
| 2004/0009063 A1 * | 1/2004 | Polacsek | ................ | F03D 1/0608 416/1 |
| 2004/0184921 A1 * | 9/2004 | Schreiber | ................ | B23P 15/04 416/229 R |
| 2007/0245697 A1 * | 10/2007 | Pavlatos | ................ | B01D 45/12 55/306 |
| 2008/0075602 A1 * | 3/2008 | Hill | ................ | F01D 5/282 416/230 |
| 2008/0226454 A1 * | 9/2008 | Decker | ................ | F04D 29/384 416/203 |
| 2009/0016872 A1 | 1/2009 | Anghileri | | |
| 2009/0155060 A1 * | 6/2009 | Jarrah | ................ | F04D 13/024 415/182.1 |
| 2009/0243300 A1 * | 10/2009 | Davis | ................ | F03B 13/10 290/54 |
| 2010/0069847 A1 * | 3/2010 | LaRose | ................ | A61M 1/1008 604/151 |
| 2010/0111675 A1 * | 5/2010 | Wojtyczka | ................ | F04D 29/023 415/119 |
| 2010/0139241 A1 | 6/2010 | Lenk | | |
| 2010/0158684 A1 | 6/2010 | Baralon | | |
| 2011/0095912 A1 | 4/2011 | Sands et al. | | |
| 2011/0148117 A1 * | 6/2011 | Bailey | ................ | F03B 3/18 290/52 |
| 2011/0185700 A1 | 8/2011 | Newcomer | | |
| 2012/0063909 A1 * | 3/2012 | Bottome | ................ | F01D 5/20 416/228 |
| 2012/0068021 A1 * | 3/2012 | Babinsky | ................ | B64C 39/064 244/23 R |
| 2012/0082559 A1 * | 4/2012 | Guglielmin | ................ | F01D 5/147 416/241 R |
| 2012/0195749 A1 * | 8/2012 | Avedon | ................ | F21V 33/0096 415/211.2 |
| 2015/0176491 A1 | 6/2015 | Alnafisah | | |
| 2015/0345391 A1 | 12/2015 | Snyder | | |

* cited by examiner

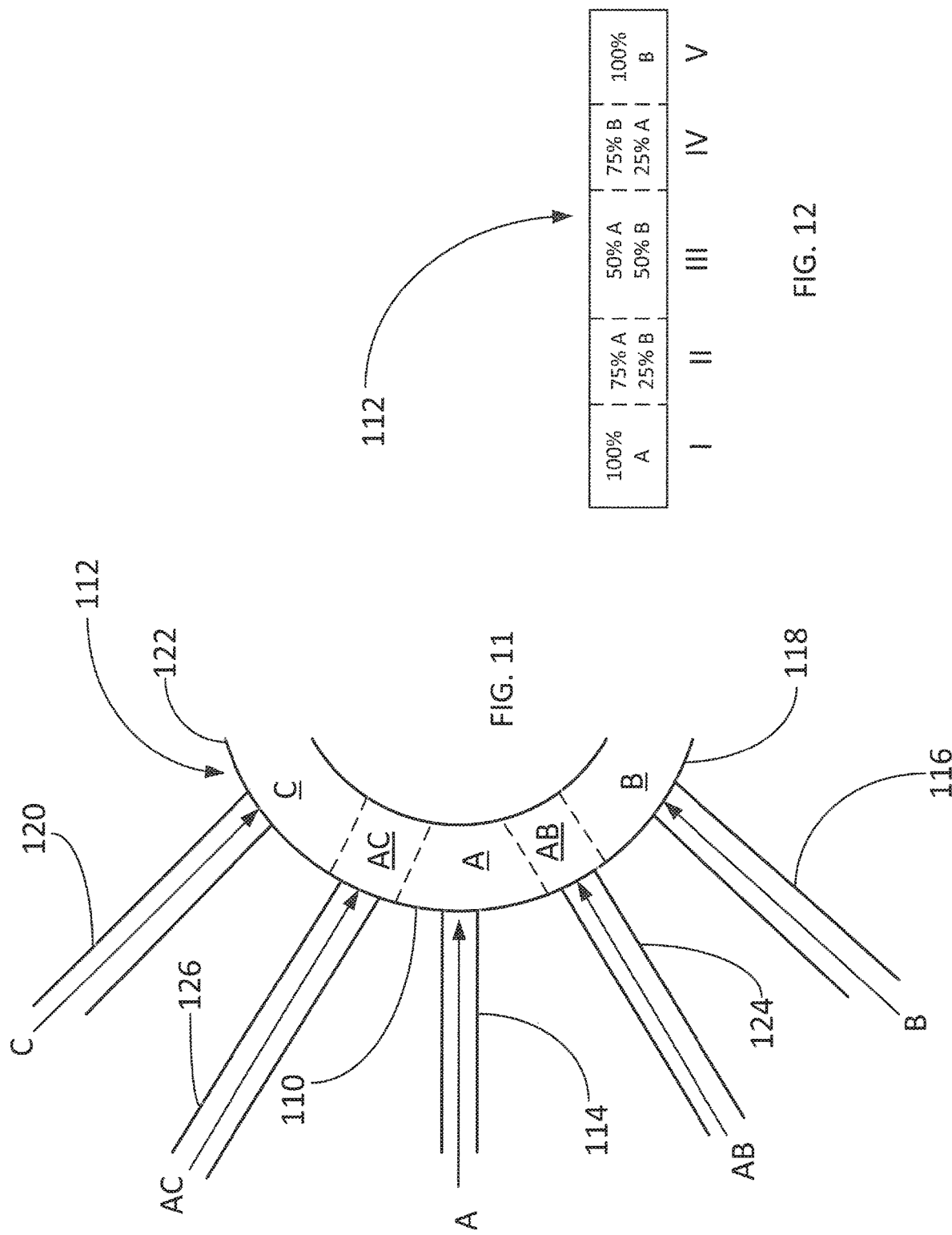

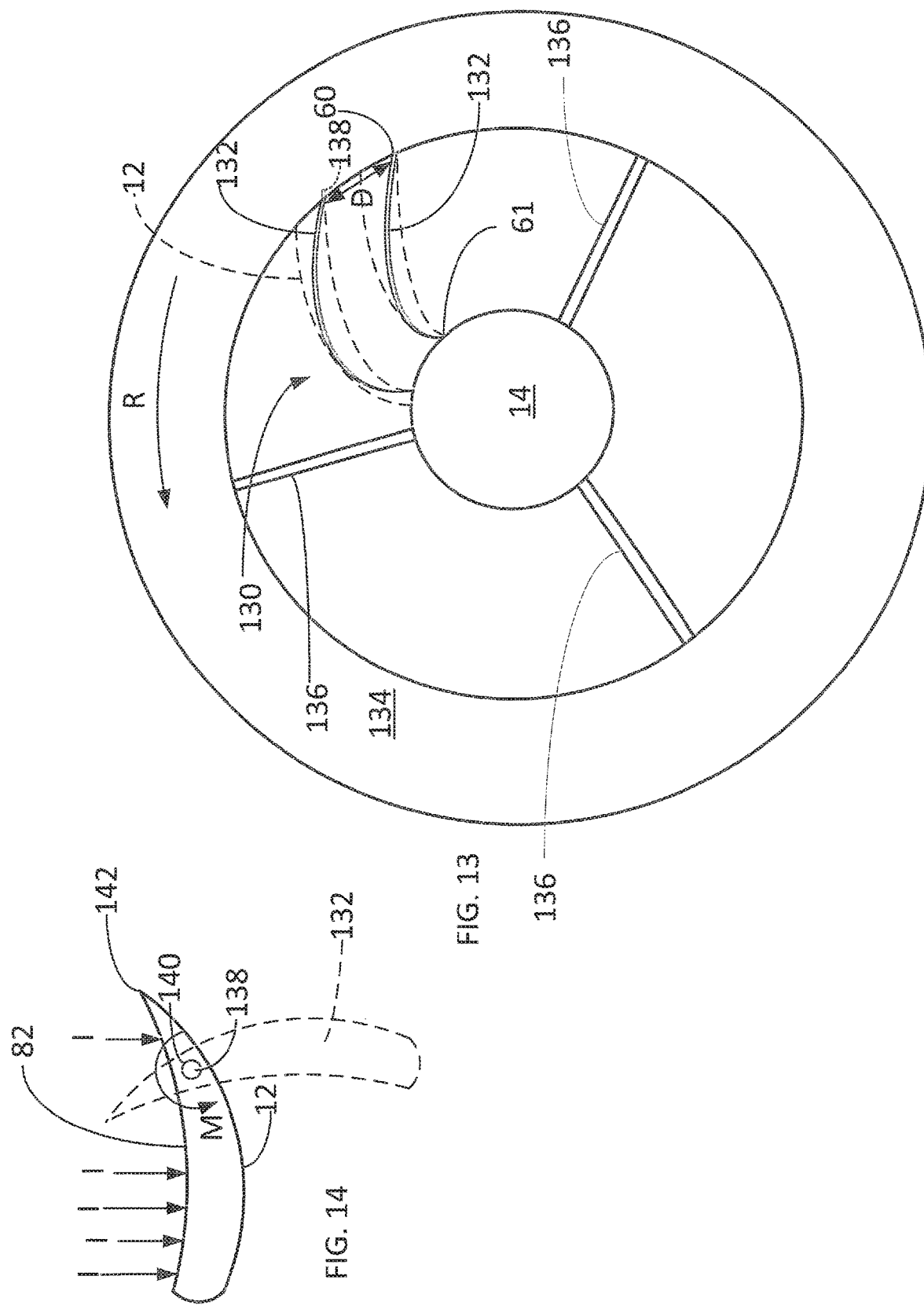

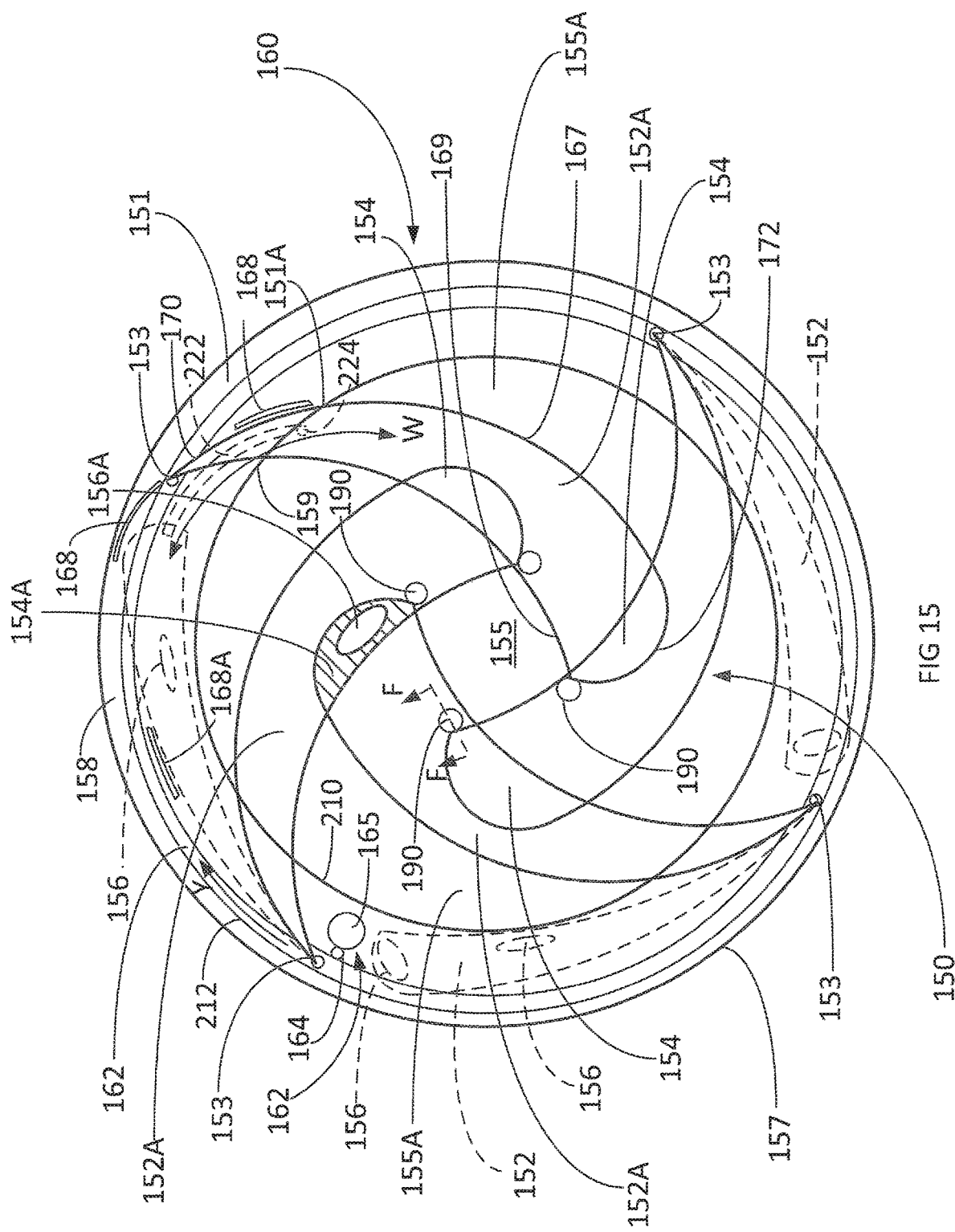

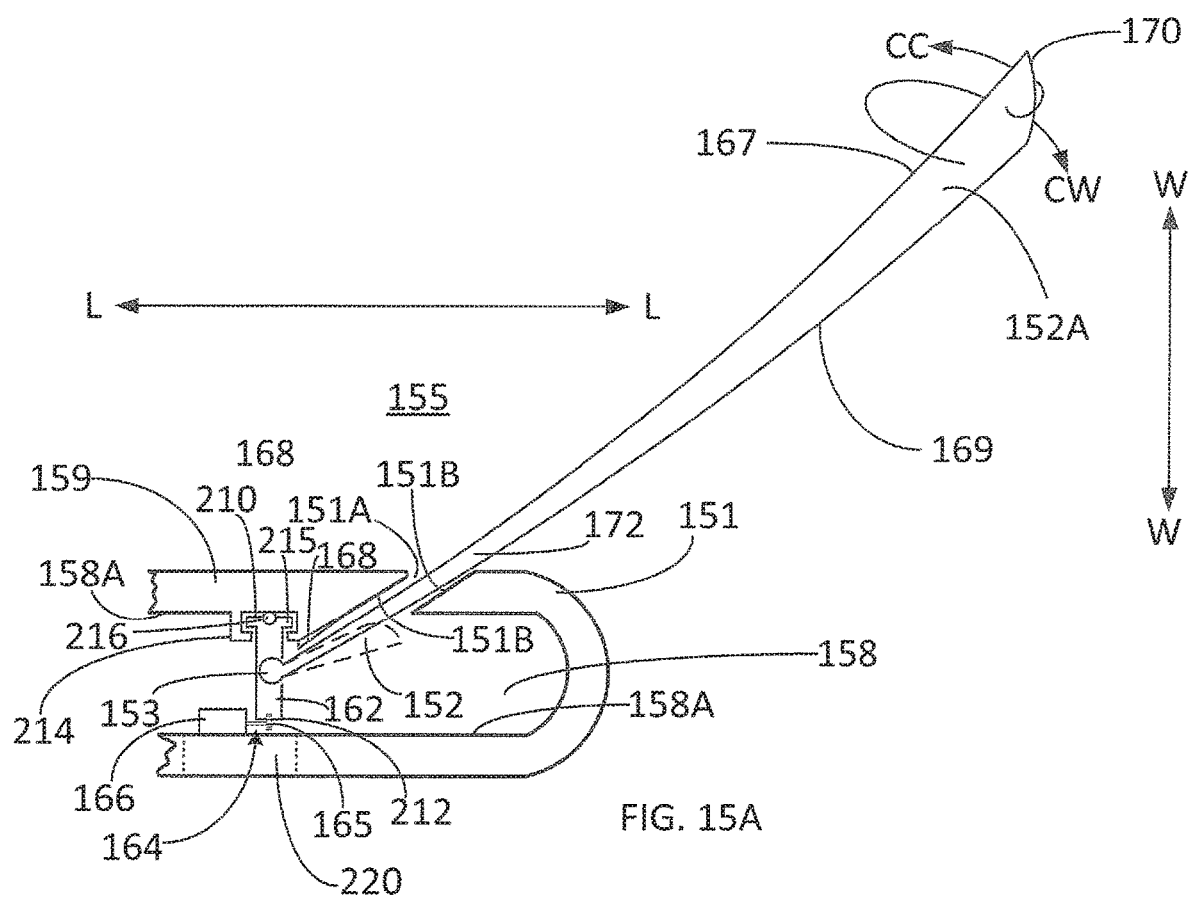

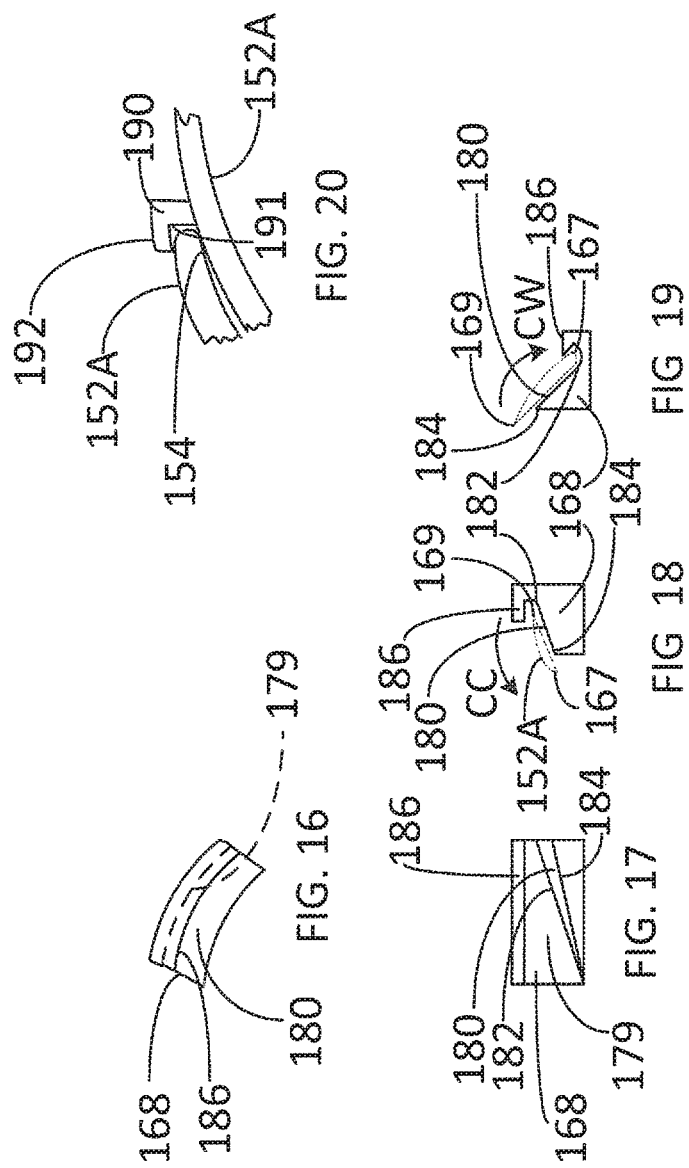

JET ENGINE WITH DEFLECTOR

CROSS REFERENCE TO RELATED APPLICATIONS

This application is a continuation of U.S. patent Ser. No. 14/594,747, filed Jan. 12, 2015, which is a continuation of U.S. patent application Ser. No. 13/888,897, filed May 7, 2013, which issued as U.S. Pat. No. 8,968,437 on Mar. 3, 2015, entitled JET ENGINE WITH DEFLECTOR, which is a continuation-in-part of U.S. patent application Ser. No. 13/462,181, filed May 2, 2012, entitled JET ENGINE DEFLECTOR, which issued as U.S. Pat. No. 8,657,895, on Feb. 25, 2014, the contents of all of which are incorporated by reference herein in their entirety.

TECHNICAL FIELD

This disclosure relates in general to deflector apparatus and in particular to deflector apparatus for use with apparatus having an air intake, including turbine engines such as aircraft power plants and the like.

BACKGROUND

The problems caused by ingestion of foreign objects into the air inlet of jet engines have long been recognized in the art. This problem is particularly acute with jet engines used on aircraft, since such engines are operated in an environment where foreign objects cannot be removed or controlled. The engines of jet aircraft taxiing on the ground frequently ingest foreign objects such as tools and other small metal objects, while a jet aircraft in flight is susceptible to ingestion of birds, leaves, paper, and other airborne debris.

The ingestion of almost any solid foreign object into the air inlet of a jet engine causes damage to the compressor stages, and possibly to other portions of the engine. This engine damage is immediately manifested by a partial or complete loss of available engine thrust, with consequent impairment of aircraft flying ability.

The problem of bird ingestion into jet engines is particularly acute during aircraft take-off, where an aircraft may fly through a flock of birds at precisely the time when maximum available thrust is required for a safe take-off. Since many commercial and private jet-powered aircraft have only two engines, it will be appreciated that a partial loss of power in both engines, or a total loss of power in one engine, occurring during or shortly after take-off can have drastic consequences. Post-crash investigations have proved that numerous jet aircraft crashes, resulting in loss of life and extensive property damage, are directly attributable to bird ingestion which occurred during or shortly after take-off.

According to FAA statistics, there have been over 100,000 (Civil and USAF) wildlife strikes between 1990 and 2008, and the number of strikes has climbed steadily since 1990. In 1990, the industry saw 1,738 bird strikes; in 2007, the number had increased to 7,666. Some of that trend is due to increased air travel, but the frequency of wildlife strikes has tripled from 0.527 to 1.751 per 10,000 flights.

Bird strikes, particularly of the jet's engines, can have catastrophic consequences. On Oct. 4, 1960, Eastern Air Lines Flight 375 was struck by a flock of European starlings during take-off. All four engines were damaged and the aircraft crashed in the Boston harbor. There were 62 fatalities.

Although FAA regulations require that jet engines be designed to permit continued operation after ingesting a bird of specified size at a specified aircraft speed, such design has not eliminated bird strikes causing engine damage and/or failure. On Jan. 15, 2009, a double bird strike involving Canadian geese impacted U.S. Airways Flight 1549, an Airbus A320-214, about three minutes after take-off from La Guardia airport, when the airplane was at an altitude of 2,818 feet AGL (above ground level). The bird strike resulted in an immediate and complete loss of thrust to both engines, forcing the crew to ditch the plane in the Hudson River.

FAA statistics report that 92% of bird strikes occur at or below 3,000 feet AGL, thus at a critical point of takeoff or landing. Proposed ground-based wildlife abatement programs, such as radar detection of bird flocks and use of lights, noise makers, and water cannons are of little to no use in abating bird strikes at altitudes such as Flight 1549 experienced, or higher altitudes.

The increase in bird strikes has resulted in regular reports of commercial jets being forced to make emergency landings shortly after takeoff. According to FAA statistics, gulls are the most common type of bird to strike aircraft, accounting for 19% of the birds identified in bird strikes. Doves and pigeons are the second most common, accounting for 15% of the birds identified in bird strikes. But as Flight 1549 proves, bird strikes of larger birds such as Canada geese can also occur, with devastating consequences.

There are many factors contributing to increasing rates of bird strikes by commercial and military aircraft. These factors include: 1) As jet travel replaced the noisier and slower piston-powered aircraft, the chance of these jets colliding with wildlife increased; 2) Along with the change in mode of travel there has been an increase in air traffic worldwide, both military and commercial; 3) Natural habitat surrounds many modem airports and this habitat provides shelter, nesting area, and feeding areas for wildlife that is not usually present in the surrounding metropolitan area; 4) Many of the world's busiest airports, including Washington Reagan National, Philadelphia International, New York La Guardia, and Boston Logan International, are near large bodies of water that create the aforementioned natural habitats for large water fowl such as geese and ducks; 5) Wildlife conservation measures generally serve to increase the populations of native birds. These factors result in a majority of wildlife strikes occurring within the immediate airport environment. According to FAA statistics, over $600 million dollars annually is lost due to wildlife strikes with civil aircraft in the United States alone.

The term "jet engine" as used herein is intended to include various types of engines which take in air at a relatively low velocity, heat the air through combustion, and expel the air at a much higher velocity. The term "jet engine" includes turbojet engines and turbofan engines, for example.

A jet engine conventionally comprises a compressor section for compression of the intake air, a combustion section for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft.

In the aircraft jet engine, stationary guide vane assemblies are used to turn the flow from one angle to another. The stationary guide vane assembly may be applied in a stator component of a turbo-fan engine at a fan outlet, in a Turbine Exhaust Case (TEC) and in an Inter-Mediate Case (IMC).

SUMMARY

According to an embodiment of the disclosure, there may be provided a deflector comprising a plurality of radially disposed spokes, the spokes being curvilinear in at least two planes of view.

According to another embodiment of the disclosure, there may be provided a deflector comprising a plurality of radially disposed ribs, spokes, or vanes including a narrower section proximate the forward end of the deflector, transitioning to a wider section proximate the aft end of the deflector.

According to another embodiment of the invention, there may be provided a deflector comprising a plurality of radially disposed ribs, spokes, or vanes including a thicker section proximate the forward end of the deflector, transitioning to a thinner section proximate the aft end of the deflector.

According to another embodiment of the invention, there may be provided a deflector comprising a plurality of radially disposed ribs, spokes, or vanes including one or more air inlet holes.

According to another embodiment of the disclosure, there may be provided a jet engine with an air inlet deflector, the air inlet deflector including an attachment ring attached to a structural frame of the jet engine proximate the air inlet thereof; a plurality of curvilinear vanes, each vane being curvilinear in at least two planes of view and connected at their rearward ends to the attachment ring; and a central hub positioned at the forward most end of the deflector, each of the curvilinear vanes being attached to the central hub.

According to another embodiment of the disclosure, there may be provided a method of preventing ingestion of flying debris by an air inlet, the method comprising mounting a plurality of radially spaced rib members about the air inlet; providing adjoining rib members with a maximal spacing that precludes ingestion of flying debris of a predetermined size through the maximal spacing; and configuring the rib members so as to turn incoming air from a direction generally normal to the air inlet to a direction that is at least partially radial with respect to the air inlet.

These and other features of the present disclosure will become apparent to one of ordinary skill in the art upon review of the following detailed description when taken in conjunction with the drawings and the appended claims.

BRIEF DESCRIPTION OF THE DRAWINGS

FIG. 11 is a schematic cross sectional view of a component, illustrating different materials of construction in different regions of the component and a method of fabricating the same.

FIG. 12 is a schematic representation of a component having different regions or zones comprising different materials of construction and/or blends thereof.

FIG. 13 is a schematic frontal view of a portion of an air inlet deflector of the present disclosure illustrating deflector members that may transition from a deployed orientation to a retracted orientation.

FIG. 14 is a cross section of a deflector member such as taken along lines C-C of FIG. 2.

FIG. 15 is a schematic frontal view of a retractable air inlet deflector of the present disclosure as mounted to an air inlet, for example, of a jet engine.

FIG. 15A is a partial sectional side view of a retractable air inlet deflector of the present disclosure as mounted proximate an air inlet, for example, within a jet engine air inlet cowl.

FIG. 16 is a plan view of a guide member of the present disclosure.

FIG. 17 is a frontal view of one aspect of the guide member of FIG. 16.

FIG. 18 is a right side view of the guide member of FIG. 17.

FIG. 19 is a right side view of another aspect of the guide member of FIG. 16.

FIG. 20 is a cross sectional view of an aspect of the disclosure illustrating overlapping deflector members, taken substantially along lines F-F of FIG. 15.

DETAILED DESCRIPTION OF ILLUSTRATIVE EMBODIMENTS

Figure 1:
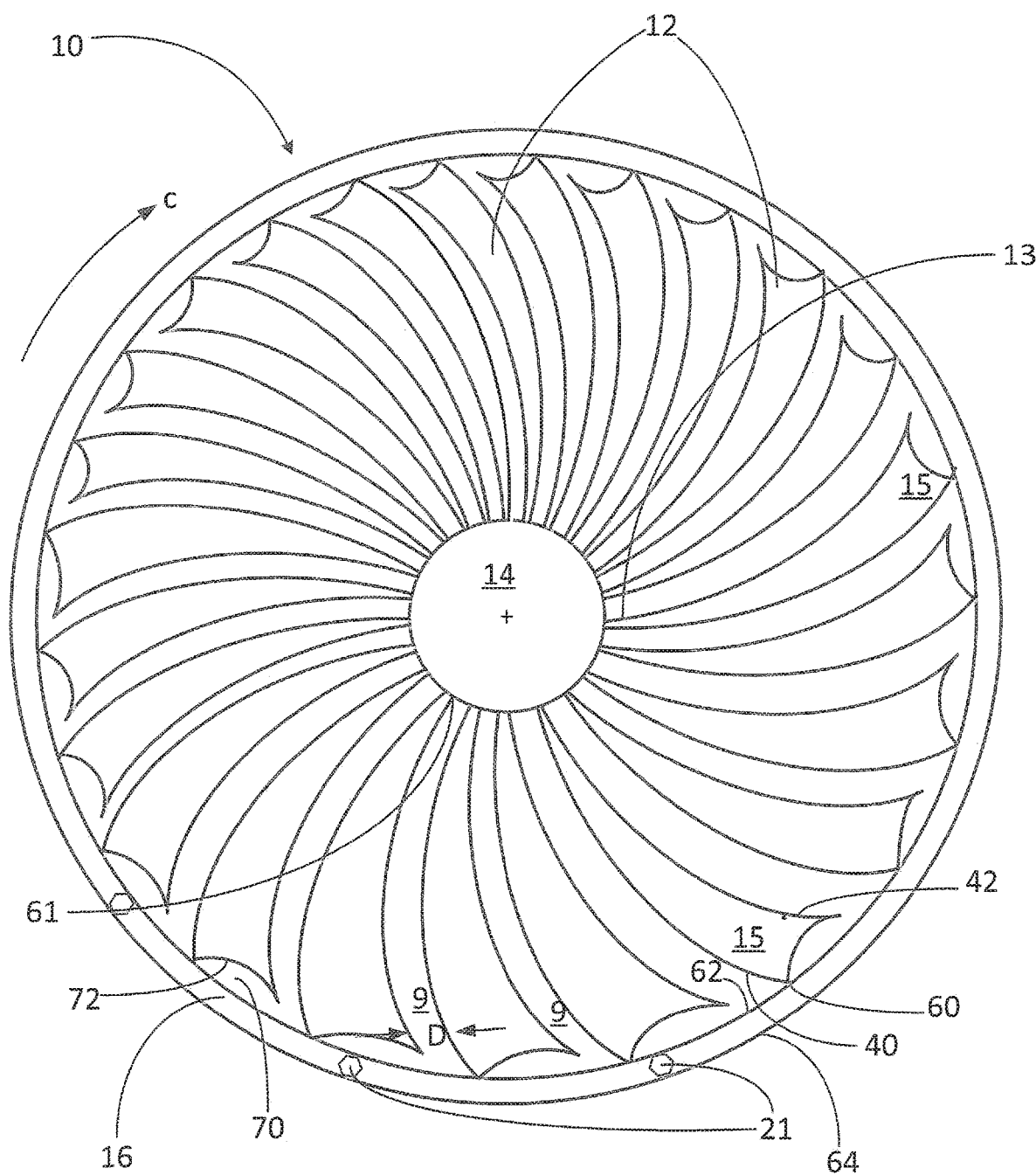
FIG. 1 is a schematic representation of a frontal view of a deflector of the present disclosure.
Figure 2:
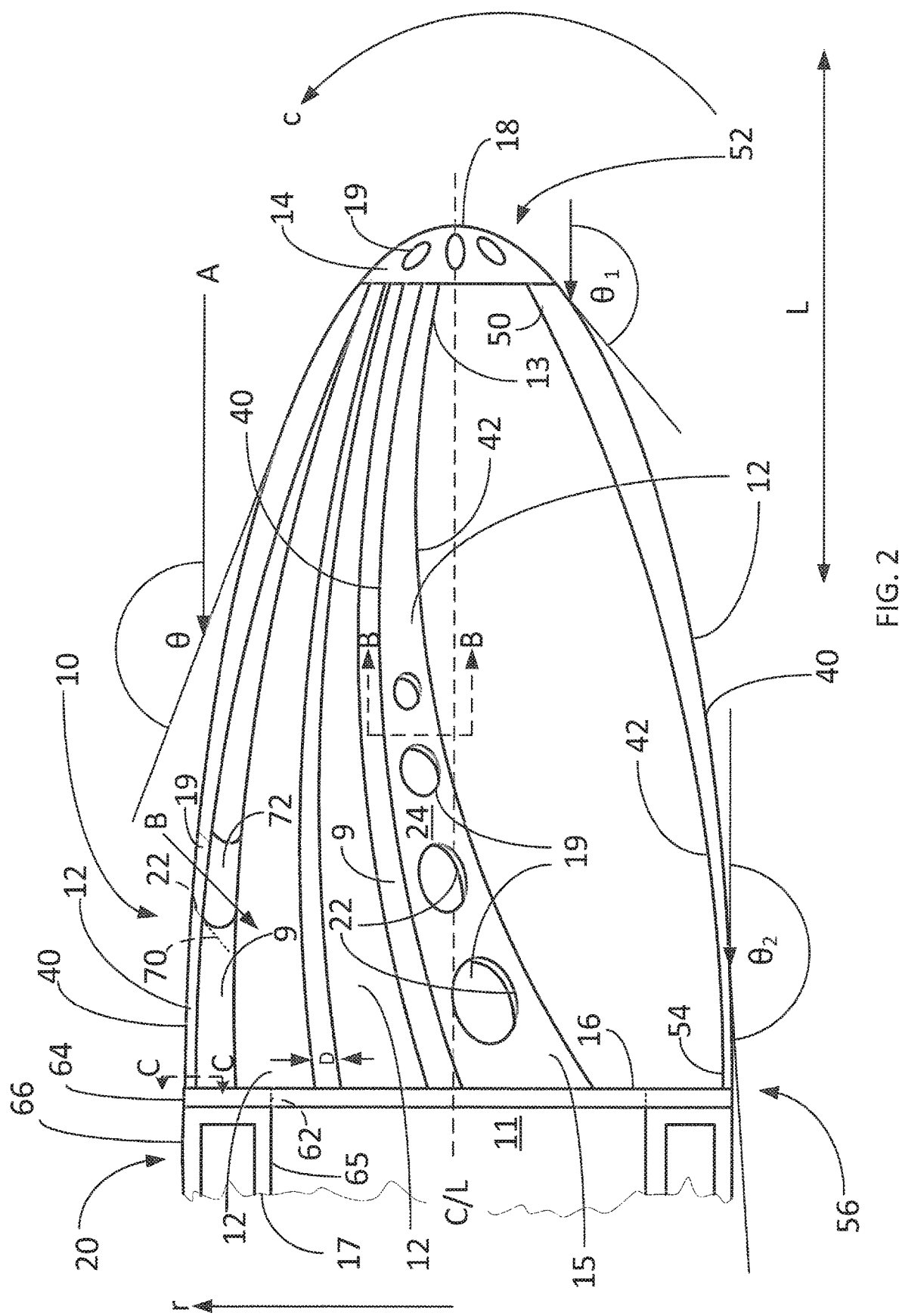
FIG. 2 is a schematic representation of a side view of a jet engine deflector system of the present disclosure.

Referring now to FIGS. 1 and 2, there are illustrated embodiments of a deflector of the disclosure, generally 10. As illustrated, the deflector 10 may comprise a series of generally radially disposed ribs, spokes, or vanes 12 arranged circumferentially about the inlet 11 of a jet engine, generally 20. The ribs, spokes, or vanes 12 may be arranged about and connected to a central hub 14.

As further illustrated in FIG. 2, the ribs, spokes, or vanes 12 may provide the deflector 10 with an elongated, generally smooth profile that may present a generally oblique angle θ relative to the direction of air flow into the engine, as illustrated by the arrow A. The embodiment illustrated in FIG. 2 is highly elongated, and not necessarily representative of the degree of elongation that would be employed in actual use, where cost and weight of materials must be minimized wherever feasible. The oblique angle θ makes it more likely that a bird or other debris striking the deflector 10 will be deflected away from the air inlet 11 of the jet engine 20 to which the deflector 10 is mounted, and not become lodged or wedged within the air inlet openings 9 between adjacent ribs, spokes, or vanes 12.

The configuration of the ribs, spokes, or vanes 12 illustrated in FIG. 2 is elliptical in profile, although other shapes, including conical, parabolic, hyperbolic, semi-oval, semi-spherical, and the like providing an oblique angle θ to the direction of impact/incoming air flow are of course possible as will now be readily apparent to those of ordinary skill in the art. As illustrated, the ribs, spokes, or vanes 12 may be separated from each other by a distance that widens slightly fore to aft, but preferably the widest distance D between adjacent ribs, spokes, or vanes 12 is small enough to prevent a large, heavy bird, such as a Canada goose, from getting through to the air inlet 11 upon impact. The widest distance D may also be small enough to present birds the size of a gull or pigeon, the most common birds ingested in bird strikes, from being ingested, although modern jet engines are typically designed to be able to handle ingestion of smaller birds.

As illustrated, the ribs, spokes, or vanes 12 may be curvilinear in two planes, as represented in FIGS. 1 and 2, which may create a spiraling effect. This arrangement may beneficially direct the incoming air from a direction that is generally normal to the air inlet, to a generally spiral direction (i.e., having a rotational component), which may assist in rotating the intake fan and/or compressor and/or turbine to a greater extent than would occur without the ribs, spokes, or vanes 12 so oriented. Thus, the ribs, spokes, or vanes 12 may act as stationary inlet air guide vanes, serving double duty as components of a deflector, as well as guide vanes acting as a stator for turning incoming air in a direction contributing to rotation of the fan, compressor(s) and/or turbine(s).

The ribs, spokes, or vanes 12 may vary in width proximate the fore end, generally 52 of the deflector 10 to the aft end generally 56, as illustrated, with the ribs, spokes, or vanes having a narrower fore end 13 and wider aft end 15. The use of ribs, spokes, or vanes 12 that widen in the circumferential direction "c" from fore to aft, as illustrated in FIGS. 1 and 2, may reduce or eliminate the need for cross bar supports between ribs, spokes, or vanes 12, or added ribs, spokes, or vanes proximate the wider end of the deflector as it nears the engine inlet 11, which supports and/or added ribs, spokes, or vanes may tend to impede air intake and/or increase drag and/or increase weight of the deflector and therefore the engine. It may, however, be desirable in certain configurations, particularly for jet engines of larger diameter, to include cross bar supports between adjacent ribs, spokes, or vanes 12.

As illustrated in FIG. 2, the ribs, spokes, or vanes 12 may have a relatively thicker region 50 proximate the fore end, generally 52 of the deflector 10, and may taper to a relatively thinner region 54, proximate the aft end, generally 56 of the deflector 10. Thus, the ribs, spokes, or vanes 12 may become relatively, generally, or progressively thinner in the radial direction "r," from fore to aft.

Such difference in thickness may contribute to minimizing weight of the ribs, spokes, or vanes 12, while providing greater thickness and therefore material and strength in the regions most needed, for example, the regions of the ribs, spokes, or vanes proximate the narrower fore end 13, while providing less thickness and less material at the wider aft end 15 of the ribs, spokes, or vanes 12. Providing greater thickness, material, and strength in the thicker region 50 may help mitigate structural damage to the deflector 10 upon impact with birds or other debris, as the fore end 52 of the deflector 10 is more likely to receive both the initial impact, and receive such an impact at a relatively smaller (i.e., more direct) angle of incidence, $\theta_1$ compared to the angle of incidence $\theta_2$ proximate the aft end 56 of the deflector 10, as illustrated by the arrows in FIG. 2.

As illustrated in FIG. 2, one or more or all of the ribs, spokes, or vanes 12 and/or central hub 14 may be further configured with one or more air inlet holes 19. Such air inlet holes 19, when applied to the ribs, spokes, or vanes 12, may be spaced along the entire length thereof, or may be positioned proximate the wider aft end 15. The air inlet holes 19 may further improve air intake through the deflector 10 to the jet engine, generally 20. The air inlet holes 19 as illustrated in FIG. 2 may be elliptical in shape, and may increase in size fore to aft as illustrated. Of course other shapes for the inlet holes 19, such as round, square, rectangular, oval, slotted, or combinations of these and other shapes may be employed. The size of the air inlet holes 19 may be small enough to preclude ingestion of large birds, such as Canada geese, or even smaller birds, such as pigeons and starlings. In addition to providing more area for air intake, the air inlet holes 19 may reduce the weight of the ribs, spokes, or vanes 12 and/or the central hub 14.

The air inlet holes 19 may include directional side walls 22 that redirect the air passing along boundary layers near the outer surface 24 of the ribs, spokes, vanes, and/or central hub 14 through the holes 19 along a desired flow path, e.g., axially in the direction of the fan and/or compressor, or with a rotational component as previously discussed. FIG. 4A illustrates one example of directional side walls 22 that may tend to direct air passing through the air inlet hole 19 from the outer surface 24 of the rib, spoke, or vane 12 through the air inlet hole 19 and along the inner surface 26 of the rib, spoke, or vane 12 as illustrated by the directional arrows. As illustrated, the air inlet hole directional side walls 22 may be tapered, which may contribute to imparting a nozzle effect to the air exiting the air inlet holes 19. Although the side walls 22 as illustrated have a generally inwardly tapered conical configuration, other configurations, e.g. cylindrical, or outwardly flaring conical, may also be used, depending on the application.

As illustrated, the ribs, spokes, or vanes 12 may be attached to an attachment ring 16. The attachment ring 16, in turn, may be attached to the frame 17 of a jet engine, generally 20, as illustrated in FIG. 2, using suitable fasteners 21, according to accepted air frame standards. Such fasteners 21 may be equally spaced about the circumference and/or perimeter of the attachment ring 16. Although the fasteners 21 illustrated in FIG. 2 may be bolts or screws, other acceptable fasteners known to those of ordinary skill in the art may be used, and may be configured to permit removal of the deflector 10 for engine maintenance.

As illustrated in FIG. 1, the ribs, spokes, or vanes 12 may be connected to the attachment ring 16 at an attachment point 60 proximate the leading edge 40 and the wider aft end 15. In the embodiment illustrated, the attachment point 60 may be attached to the inner wall 62 of the attachment ring 16. Such an attachment may permit greater air intake in the region proximate the wider aft end 15 than might be possible if the entire width of the wider aft end 15 is attached to the inner wall 62 of the attachment ring 16, as air may flow through the space 70 between the inner wall 62 of the attachment ring and outer end 72 of the spoke or vane 12.

The inner wall 62 of the attachment ring 16 may be sized to align with the inner wall 65 of the air inlet 11 to the jet engine 20 to which the deflector 10 is mounted, to further maximize incoming air, and/or mitigate the effect to which the attachment ring 16 may block incoming air. Other attachment configurations are of course possible, including attaching the wider aft end 15 of the ribs, spokes, or vanes 12 to the inner wall 62 of the attachment ring 16 across the entire width of the wider aft end 15 of the ribs, spokes, or vanes 12, as illustrated schematically in FIG. 6.

Figure 6:
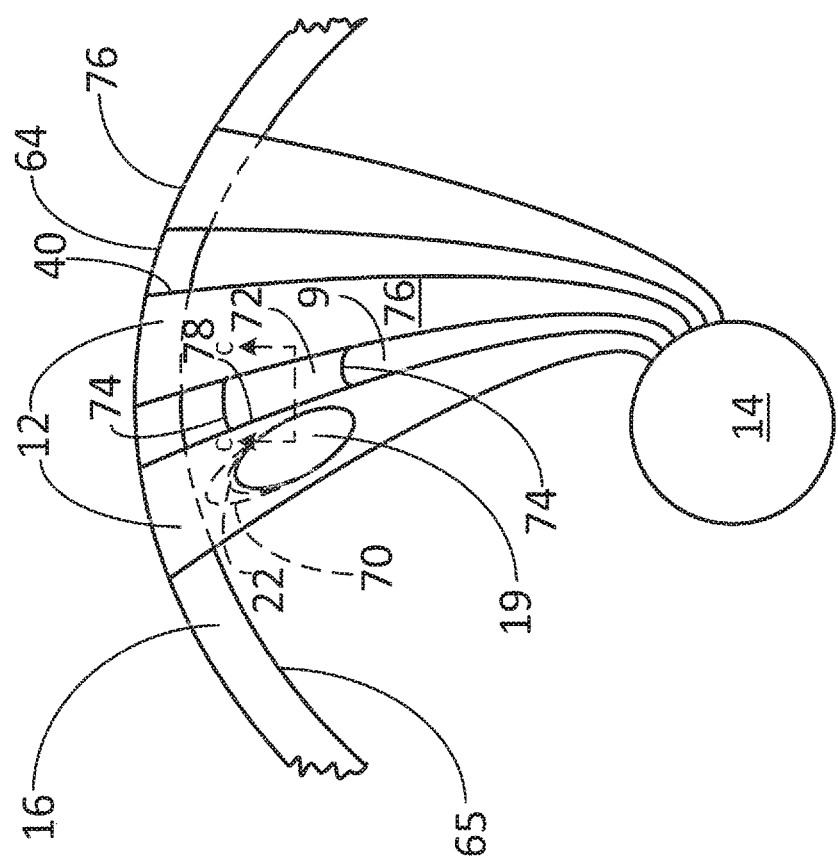
FIG. 6 is a partial frontal view of another deflector of the present disclosure.

Another attachment configuration is illustrated in FIGS. 2 and 6, where the ribs, spokes or vanes 12 may be connected to the attachment ring 16 proximate the outer wall 64 thereof. As illustrated, the outside or leading edges 40 of the ribs, spokes, or vanes 12 may be attached to the attachment ring 16 such that the leading edges 40 blend aerodynamically with the outer wall 64 of the attachment ring 16 and the outer surface or cowling 66 of the jet engine 20. In the embodiment illustrated in FIG. 6, the trailing edge 42 and the outboard surface 76 of the ribs, spokes, or vanes 12 may also blend aerodynamically with the outer wall 64 of the attachment ring 16 and the outer surface or cowling 66 of the jet engine 20 at the aft end 56 of the deflector 10, which configuration may be achieved by imparting a slight twist to the rib, spoke, or vane 12 proximate the aft end 56.

Here it may be recognized that the portion of the deflector 10 that resides outboard of the inner wall 65 of the air inlet 11 may have little to no negative impact on air intake to the jet engine 20, and indeed may actually contribute to greater air intake, for example through the use of larger air inlet holes 19 proximate the aft end 56, particularly if such air inlet holes have directional side walls 22 to direct airflow inboard of the inner wall 65, as illustrated in FIGS. 2 and 6. As there illustrated, the side walls 22 of the air inlet holes 19 that are positioned outboard of the inner wall 65 of the air inlet 11 may further include a vane member 70 that may extend radially inwardly. This vane member 70, in combination with the directional side wall 22, may cause air to be redirected from a direction substantially normal to the air inlet 11 but outboard thereof, as represented by arrow A, to a direction with a radial component, thereby directing the air inboard of the inner wall 65 so it may be ingested by the air inlet 11, as illustrated by arrow B.

Further, as illustrated in FIGS. 2 and 6, the deflector 10 may include in the air inlet openings 9 between adjoining ribs, spokes, or vanes 12 one or more directional vanes 72 to further assist in directing air toward the air inlet 11. The directional vanes 72 may comprise flat or curved members. Such directional vanes 72, in addition to providing for redirecting the air in the direction B, may further contribute to structural integrity of the deflector 10 by serving as a connector between adjoining ribs, spokes, or vanes 12.

Figure 7:
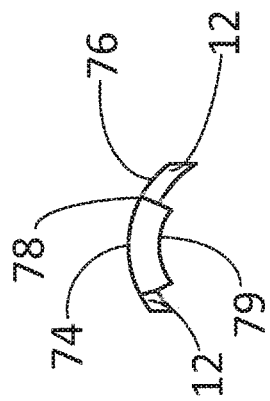
FIG. 7 is a cross sectional view of a portion of the deflector of FIG. 6 taken along broken lines C-C.

The directional vanes 72, as illustrated in FIGS. 6 and 7, may have a curved outboard surface 74 that may blend with and may have substantially the same arc or curvature as the outboard surface 76 of the ribs, spokes, or vanes 12 to which it is joined at the points of connection 78. The directional vanes 72 may further comprise an inboard surface 79 that may be directed and/or extend inboard of the inner wall 65 of the air inlet 11, and may be straight or, as illustrated in FIG. 7, curvilinear, and may direct air radially inboard of the inner wall 65 of the air inlet 11 toward the air inlet 11. When appropriately sized and positioned, the combination of directional vanes 72 with vane members 70 outboard of the inner wall 65 of the jet engine air inlet 11 may cause virtually all air that would, in connection with a jet engine 20 having no deflector 10, to strike the outer cowling of the engine and not reach the air intake 11, to be redirected generally in the direction of arrow B, substantially increasing airflow into the engine 20.

The ribs, spokes, or vanes 12 may, in cross section, be shaped as airfoils or as the guide vanes shown as element 208 of FIG. 2 of US 2010/0158684 A1, incorporated in its entirety by reference herein. Whereas the guide vanes 208 of that disclosure, however, are struts that terminate in an outer ring, the profile of the vanes or spokes of the present disclosure may be arcuate or curvilinear, i.e., semi-elliptical, semi-spherical, parabolic, hyperbolic, semi-oval, etc., in shape from fore to aft, creating the oblique angle previously described. Such an embodiment is illustrated in FIG. 3.

Figure 3:
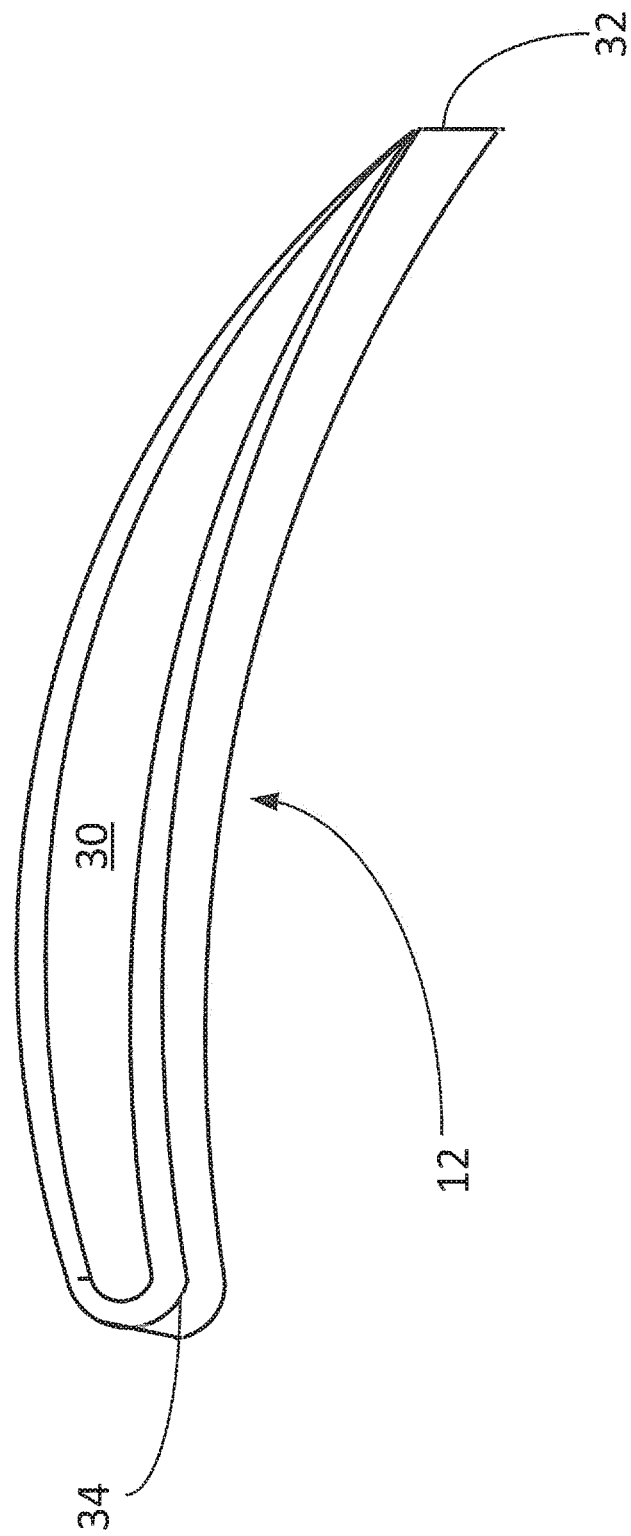
FIG. 3 is an isometric view of a deflector rib, spoke, or vane of the present disclosure.

In the embodiment of the disclosure illustrated in FIG. 3, the ribs, spokes, or vanes 12 may have a generally hollow interior region 30, which may serve to reduce the weight of the ribs, spokes, or vanes 12. As further illustrated, the ribs, spokes, or vanes 12 may be shaped with a narrow forward section 32 that widens to a curved aft section 34. The rib, spoke, or vane embodiments of FIG. 3 may be oriented about the jet engine inlet 11 generally like stator vanes, and may create a change in tangential velocity of the incoming air, as well as increasing that velocity through a nozzle effect caused by proximity of the ribs, spokes, or vanes 12 to adjacent ribs, spokes, or vanes 12. The effect of this orientation of the ribs, spokes, or vanes 12 may be to change the direction of incoming air from a direction generally normal to the air inlet to a direction that is at least partially rotational relative to the air inlet, thereby providing a change in the tangential momentum of the air, causing a torque on the rotor in the direction of rotation. The ribs, spokes, or vanes 12 may also be oriented so as to have an angular pitch in order to improve air intake and/or tangential air velocity.

Figure 5:
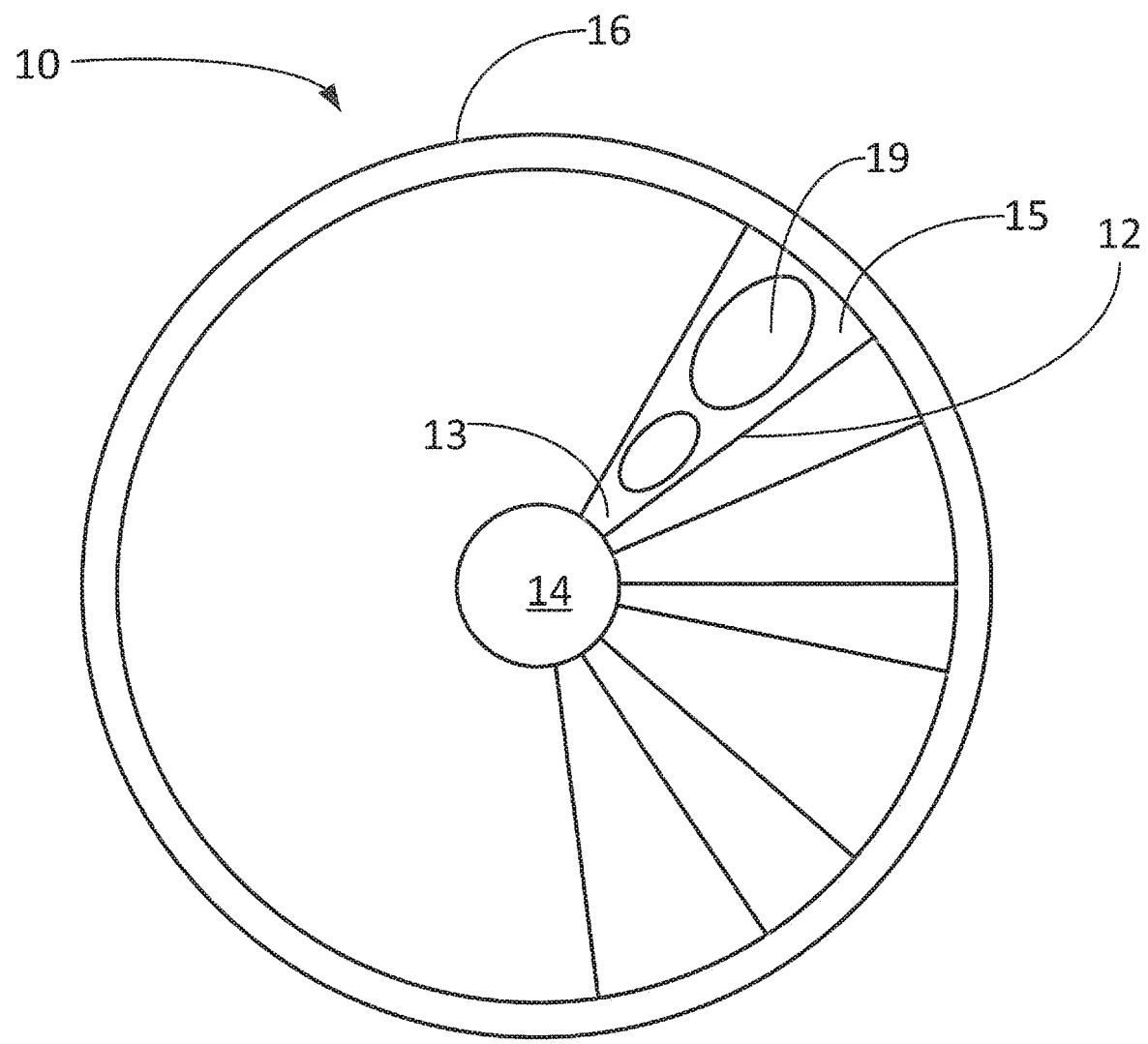
FIG. 5 is a schematic representation of a portion of a front plan view of another deflector of the present disclosure.

In another embodiment of the disclosure, the ribs, spokes, or vanes 12 are not oriented in a spiral configuration. Rather, the ribs, spokes, or vanes 12 may be curvilinear in only one plane, and thus may appear to have straight edges when the deflector 10 is viewed from the front, as illustrated schematically in FIG. 5, and may further appear curvilinear, e.g., semi-circular, semi-ellipsoidal, parabolic, hyperbolic, and/or semi-oval, when the deflector 10 is viewed from the side. Straight ribs, spokes, or vanes 12 such as illustrated in FIG. 5 may also employ a relatively narrow fore section 13 transitioning to a wider aft section 15, and/or a relatively thicker region 50 proximate the fore end 52, transitioning to a relatively thinner region 54 proximate the aft end 56 of the deflector 10, and may further include one or more air inlet holes 19, which may include direction side walls 22, as previously described.

The ribs, spokes, or vanes 12 are not shown to scale, or with the optimal number of ribs, spokes, or vanes that might be present on a jet engine according to the present disclosure, and the curvatures and proportions shown may be somewhat exaggerated for visual clarity. It will now be readily apparent to those of ordinary skill in the art that the disclosure may be optimized to minimize weight, and maximize air intake, while maintaining adequate strength of the deflector to resist bird strikes and ingestion of other flying debris.

Figure 4:
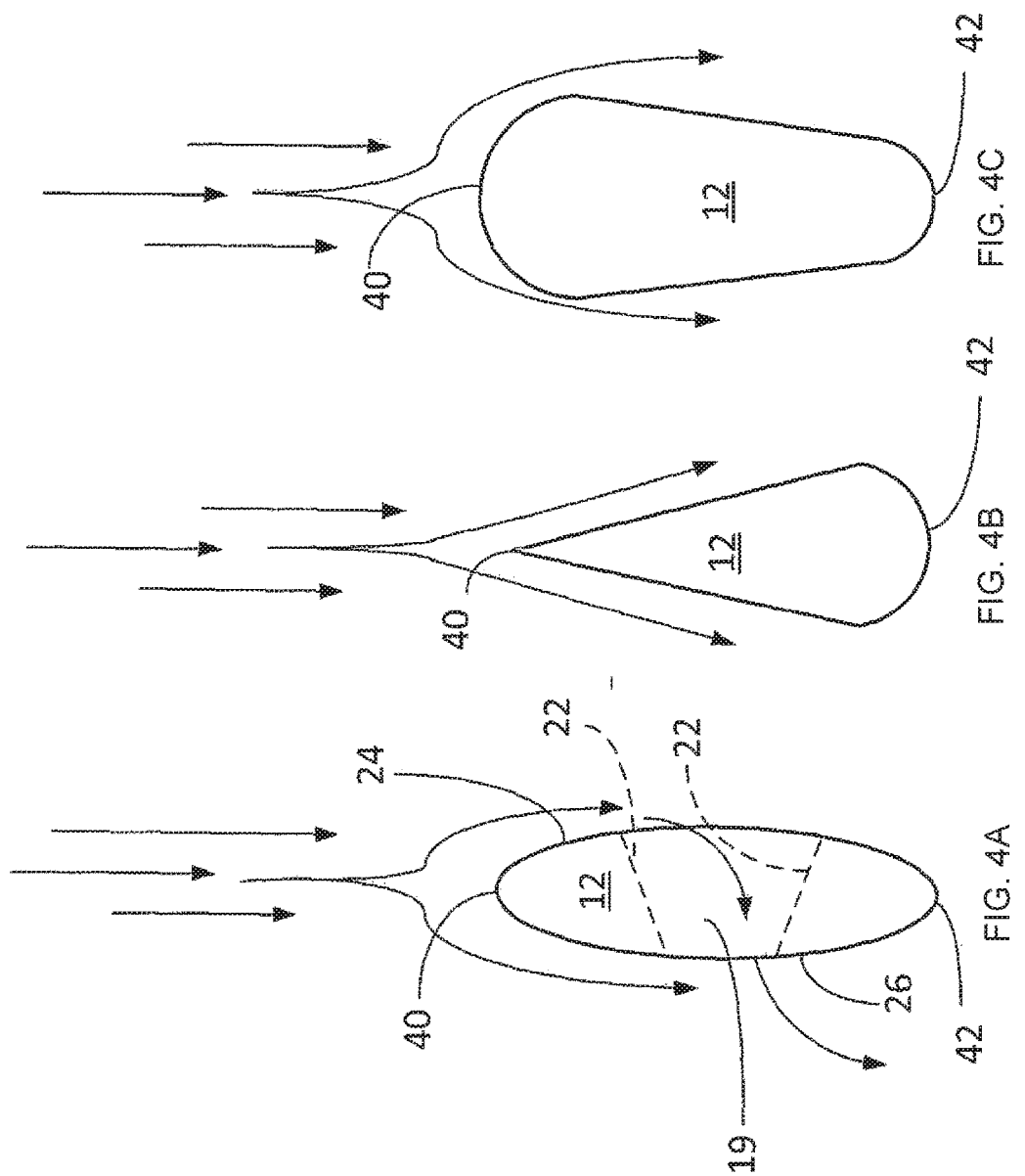
FIGS. 4 A-C are cross sectional views of exemplary deflector rib, spoke, or vane configurations as viewed along broken lines B-B of FIG. 2.

Whether the ribs, spokes, or vanes 12 are curvilinear in one or two planes, it may be advantageous for the ribs, spokes, or vanes to have an aerodynamic and/or airfoil-shaped cross section, similar to that of a turbine blade or a stator, although the ribs, spokes, or vanes may, for example, be round, oval, square, rectangular, or triangular in cross section as well. FIGS. 4 A-C represent a few possible, but by no means only, aerodynamic and/or airfoil cross sectional shapes of the ribs, spokes, or vanes as taken along the view represented by broken arrow lines B-B of FIG. 2. When such configuration is used, the ribs, spokes, or vanes 12 may include a leading edge 40 and a trailing edge 42 designed to permit maximum flow of air around the spoke or vanes 12 and reduce drag, as illustrated by the arrows representing splitting of the airflow around the ribs, spokes, or vanes 12. The ribs, spokes, or vanes 12 may be positioned or angled such that the leading edge 40 may be positioned slightly outboard with respect to the trailing edge 42, as best seen in FIGS. 1 and 2.

Jets often strike birds at a relatively high velocity associated with takeoff, e.g. 200 knots calibrated air speed or greater, and the impact of such strikes, in addition to causing catastrophic engine failure, has been known to seriously damage other structures of the plane, for example, shattering windshields and rupturing the fuselage. Because of the speed with which a jet may be traveling upon impact in a bird strike, and given the potential for striking large birds such as geese, albatross, vultures, ducks, etc., the deflector 10 may be designed to maximize impact strength while minimizing added weight to the engine. Accordingly, the ribs, spokes, or vanes 12 may be fabricated from carbon-fiber composite, or other known material in the aerospace industry, including by way of example aluminum, titanium, and alloys thereof, and resin-impregnated Kevlar® fabric or fibers, and the like.

As ballistic materials such as Kevlar® fiber and fabric are sometimes used as an engine wrap to contain turbine blades, preventing them from puncturing the jet's cabin in a blade-out scenario, the same material may be advantageously used in fabricating the deflector 10 and its components as will now be appreciated by those of ordinary skill in the art. As will also now be appreciated, when the ribs, spokes, or vanes 12 have a multiple curve configuration, being curvilinear in at least two planes, e.g., elliptical in side profile as illustrated in FIG. 2, and spiral in front plan view as illustrated in FIG. 1, such multiple bends, particularly when metal is used, may increase the strength of the ribs, spokes, or vanes 12 relative to those that are merely straight rods or curvilinear in only one plane.

The ribs, spokes, or vanes 12 may be attached directly to the frame 17 of the jet engine, or, particularly in a retrofit scenario, may be attached to an attachment ring 16 using appropriate fasteners or other attachment methods. When an attachment ring 16 is used, it may be fabricated of the same material as the ribs, spokes, or vanes 12, or a different material. When the same material is used, e.g., carbon-fiber composite, the attachment ring 16 may be fabricated as a unitary piece with the ribs, spokes, or vanes 12 and the central hub 14. Due to molding constraints, it may be necessary, in order to mold the attachment ring 16, ribs, spokes, or vanes 12, and central hub 14 together, to mold the deflector in two or more sections which may then be joined together. If the deflector 10 or its various components are molded, the molding process may create an opportunity to incorporate heating elements within the structures of the deflector 10, such as the ribs, spokes, or vanes 12, and/or central hub 14, which heating elements may be used for deicing purposes.

If metal, e.g., titanium or an alloy thereof, is used for the ribs, spokes, or vanes 12, central hub 14, and/or attachment ring 16, the components may be connected using known methods such as welding or riveting, or the deflector 10 may be cast as a unitary piece. If metal components are used for the deflector 10, deicing heating elements may be incorporated within channels or grooves in the various deflector components or fastened to an outer surface of the components using known techniques. The attachment ring 16 may be fastened to the frame of the jet engine with fasteners, 17, such as bolts 21, for ease of installation and removal for engine maintenance.

The central hub 14 may comprise a solid or hollow structure in the shape of a truncated cone, having a blunt, rounded frontal surface 18 as illustrated in FIG. 2, and may be fabricated of the same material as the ribs, spokes, or vanes 12, or a different material. If the deflector 10 is fabricated of a moldable material, such as carbon-fiber composite, the ribs, spokes, or vanes 12 and central hub 14 may be molded as a single unit. If metal is used, the ribs, spokes, or vanes 12 may be welded or riveted to the central hub 14. The central hub may, particularly in a molded configuration of the deflector 10, merely comprise the central point of joinder of all of the ribs, spokes, or vanes 12, and thus may not appear as a separate component, and may have a small or even no discernible diameter.

In another aspect of the disclosure, the deflector 10 may be molded integrally with the frame 17 of the jet engine, avoiding the need for an attachment ring 16. Molded jet components fabricated from lightweight composite materials, such as carbon fiber reinforced plastic (CFRP), used on Boeing's 787 Dreamliner, are known in the art. Carbon-fiber-reinforced polymer, carbon-fiber-reinforced plastic or carbon-fiber reinforced thermoplastic (CFRP, CRP, CFRTP or often simply carbon fiber), is an extremely strong and light fiber-reinforced polymer which contains carbon fibers. The polymer is most often epoxy, but other polymers, such as polyester, vinyl ester or nylon, are sometimes used. The composite may contain other fibers, such as aramid e.g. Kevlar, Twaron, aluminum, or glass fibers, as well as carbon fiber. The strongest and most expensive of these additives are carbon nanotubes While the intense heat generated in the internal power plant of a jet engine would generally require use of high temperature metal alloys in such regions, such high temperatures may be of less concern at the outer, air inlet region of the engine, which is in fact exposed to extreme cold temperatures in flight. Thus, composite nacelle construction, such as a seamless composite nacelle with a low drag integrated inlet and fan cowl manufactured by Nexcelle, 30 Merchant Street, Princeton Hill, Cincinnati, Ohio 45246, is reportedly being used on the Comac C919 jet. It is thus advantageous to integrally mold a deflector, such as the deflector 10 of the present disclosure, with the frame, inlet cowl, and/or nacelle of the jet engine, provided the molded CFRP or other composite material does not extend too close to the hot interior or too near the hot exhaust region of the engine. When such integral molding is done, however, it may be necessary to provide for one or more additional access ports and/or openings proximate the front of the jet engine to permit entry of maintenance personnel therein for performing service, inspection, repair, etc. Alternatively, the deflector may be integrally molded to an attachment member, such as an attachment ring 16 as previously described, permitting the entire deflector 10 to be removed from the frontal portion of the engine for inspection or maintenance.

Further the deflector 10 may be integrally molded with the integrated inlet and fan cowl, such as that manufactured by Nexcelle, which inlet and fan cowl may be installable on and/or removable from the jet engine as a single unit. By integrally molding the deflector 10 and nacelle components in this way, it is possible to maximize aerodynamic efficiency, reduce drag, and improve performance.

It is appreciated that any deflector 10 placed fore of a jet engine inlet may tend to reduce the volume of air flowing into the inlet, with consequent loss of engine efficiency, thrust, fuel economy, etc. It may, therefore, be necessary to increase the diameter of the jet engine air intake in order to account for any decrease in air intake associated with mounting the deflector 10 to the engine. The configuration as taught by the present disclosure may, however, tend to minimize the amount of air that is deflected from the air inlet, by virtue of the configuration of the ribs, spokes, vanes, and/or central hub, the air inlet openings and holes, and the shape and orientation thereof as disclosed herein.

Figure 8:
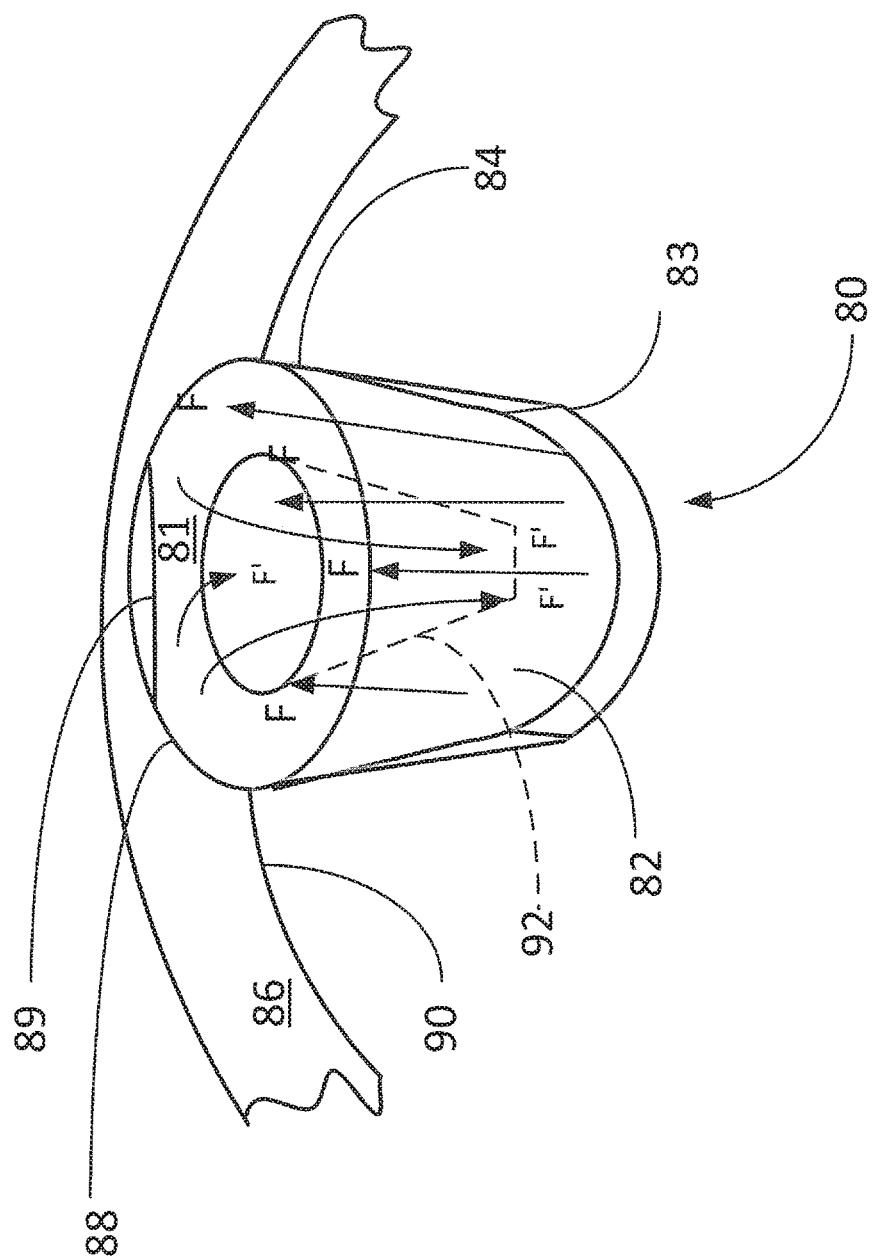
FIG. 8 is an isometric partial cross sectional view of a deflector member of the present disclosure.
Figure 9:
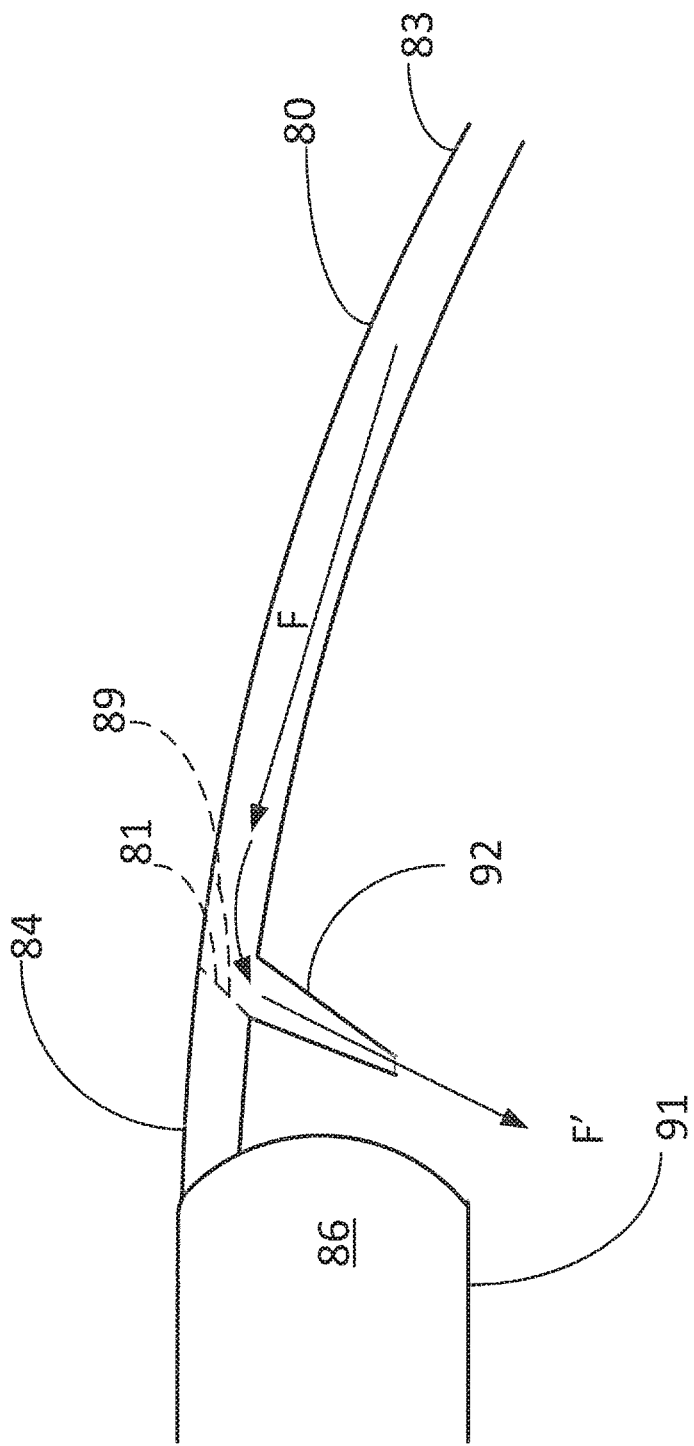
FIG. 9 is a schematic representation of partial side view of a deflector member of FIG. 8 in relation to an air inlet cowl.

Another aspect of the disclosure that may tend to minimize air blockage attributable to the deflector 10 is illustrated schematically in FIGS. 8 and 9. FIG. 8 illustrates a partial cross section of a rib, vane, or spoke member, generally 80, that may have a channel, groove, gutter, or other shape 82 therealong that may contribute to directing incoming air along the member 80 from fore to aft, as opposed to being deflected away from the jet engine air inlet. As such, the flowing air, illustrated by arrows F, may be channeled along the member 80 from the fore end 83 to the aft end 84 of the member 80. The channel, groove, gutter, or other configuration may have a spherical, parabolic, hyperbolic, ellipsoidal, or other smoothly curved shape. As illustrated, the aft end 84 may be attached to, or formed integrally with, the nacelle cowl 86. As best seen in FIG. 8, the aft end 84 of the member 80 may include an aperture 88, which may be an annulus or funnel-shaped section, that may gather the air F flowing along the member 80 and redirect it via a side wall 81 in a direction inboard of the inner wall 90 of the nacelle cowl 86 toward the rotors of the engine, as illustrated by the arrows F'. This aperture 88 may further include a directional extension 92, which may redirect the air F inboard of the inner wall 90 as illustrated. The aperture 88 may further include a cover 89 that may trap and force the air F into the extension 92. This directional extension 92 may comprise a nozzle to increase the pressure of the air F' exiting the extension 92 being directed toward the rotors of the engine. The aperture 88 and/or directional extension 92 may be formed directly in the nacelle cowl, and may be employed with or without members 80.

In another aspect of the disclosure, greater strength may be provided in certain regions or the deflector 10, for example, proximate the fore end 52 of the deflector 10 relative to the aft end 56 by employing different materials of construction in those regions, respectively, without the need to vary the thickness and/or width of the ribs, spokes, vanes, or other deflector member employed from fore to aft. For example, in the case of an engineered composite material such as carbon fiber reinforced plastic (CFRP), the deflector 10 may be manufactured using a CFRP having a greater stiffness and/or higher strength-to-weight ratio in a region likely to experience a more direct impact, such as the fore end 52 of the deflector 10, and a lower stiffness and/or lower strength-to-weight ratio in a region likely to experience a less direct impact, such as the aft end 56 of the deflector 10. In this way, it may be possible to fabricate the deflector 10 with greater impact strength where it is most needed, namely proximate the regions where the angle of incidence $\theta_1$ of airborne matter striking the deflector 10 is more direct relative to the angle of incidence $\theta_2$, where the angle of incidence is less direct, and less impact strength may accordingly be needed.

Such use of different materials may also contribute to providing the deflector 10 with a greater shock absorption capability, particularly in the less direct angle of incidence regions $\theta_2$, where it may be possible to compensate for use of lower strength and/or lower stiffness material by employing material having more flexibility and/or resiliency and greater shock absorbency. Different densities of materials may also achieve a similar result, as may the use of different metals and/or alloys. The use of such different materials may be accomplished by creating different zones in the ribs, vanes, spokes, or other members comprising the deflector 10, and/or by gradually transitioning, for example from a high strength, and/or high stiffness material proximate one end, such as the fore end of the deflector 10, to a lower strength, and/or lower stiffness material proximate the opposite end, such as the aft end of the deflector 10. The uses of different materials may be accomplished during the molding process, by simultaneously injecting different materials having different impact strengths, densities, and/or stiffness and/or other properties, through different injection ports in a mold used to form the deflector 10.

Using materials having different properties, i.e., impact strengths, and/or using different thicknesses may also be advantageously employed in other regions of an aircraft, as it is also common for bird strikes to occur, for example, impacting the aircraft's nose cone, wing, tail section, engine nacelle or air inlet cowl, windshield, fuselage, etc. The outer skin of such aircraft components may therefore be fabricated, for example, such that the thickness and/or impact strength and/or other physical property of the component varies according to its location on the aircraft. For example, in the case of an aircraft component 100, such as a wing, illustrated schematically in FIG. 10 in cross section, the component's leading edge 101, which would end to experience the greatest impact from airborne debris, may be fabricated of a higher impact strength material and/or greater thickness than the a region of the component 100 less likely or even unlikely to experience a direct impact from airborne matter, such as a wing's top surface 102. Such variation in thickness and/or impact strength and/or other property may be achieved, for example, by continuously varying the thickness and/or impact strength and/or other property in proportion to the angle of impact $\theta_1$-$\theta_\infty$. Additionally, or optionally, the material thickness and/or impact strength and/or other property may be varied in different zones, but be substantially consistent within each zone. For example, the leading edge 101 of a wing may, due to the angles of takeoff and landing, have a frontal zone that may experience a direct angle of impact $\theta_1$ across any portion of the frontal zone depending on the angle(s) of takeoff and landing at the time of impact. It may thus be desirable to fabricate such a frontal zone in its entirety with a higher impact strength material than other zones of the component.

Figure 10:
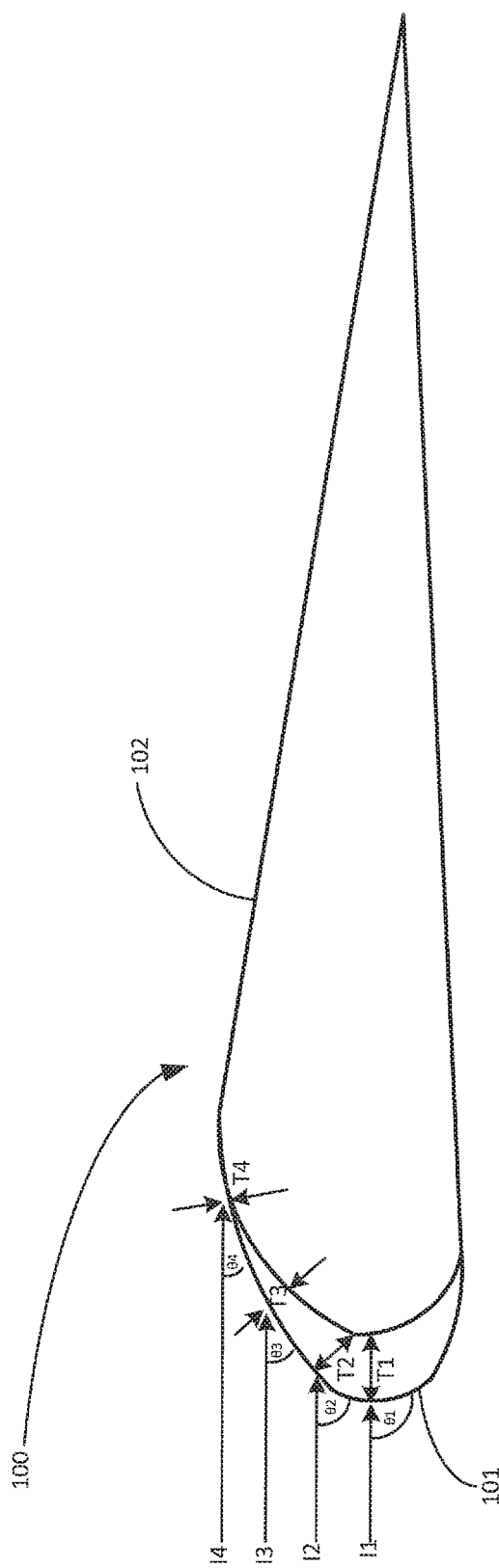
FIG. 10 is a cross sectional view of a component, such as an aircraft wing, illustrating different materials of construction in different regions of the component.

The aspect illustrated in FIG. 10 is schematic, for illustrative purposes, and not necessarily to scale, and thus may appear somewhat exaggerated relative to how an actual size cross section of a wing or other aircraft component 100 might appear. As illustrated, the leading edge 101 of the aircraft component 100 may, due to its aerodynamic curvatures, face different angles of incidence of both airstreams and airborne matter, illustrated by arrows $I_1$-$I_4$ and their corresponding angles of incidence, $\theta_1$-$\theta_4$. As further illustrated, the component 100 may comprise different thicknesses of material $T_1$-$T_4$, corresponding with the differing angles of incidence $\theta_1$-$\theta_4$.

Although the component 100 as illustrated may have varying thicknesses $T_1$-$T_4$ to provide greater strength and/or stiffness, such as greater impact strength, in regions more likely to experience more direct impact from airborne matter, as will now be appreciated, the component may also employ different materials having different strength-to-weight ratios and/or different masses, and/or different densities, and/or different stiffness and/or other properties. Providing such varying materials on aircraft components fabricated of aluminum and aluminum alloys, though possible, would be less feasible than providing such different materials during a molding process, such as may be accomplished using composite materials of the type now employed in fabricating aircraft components. Using a molding process, such as injection molding, aircraft and other components may be fabricated having varying thicknesses and/or varying materials according to the strength, stiffness, or other requirements of the component in different regions thereof. Such variability of components is particularly useful in the aerospace industry, where issues of drag, lift, weight, material cost, and the like make it desirable that no more material than necessary for safety, structural integrity, performance, etc., be employed at any given point of the component.

Accordingly, varying the material used in fabricating a component may be achieved in several ways, including using different materials at different injection ports for injection molded components formed as a unitary piece. In this way, a gradual blending of different components may be achieved and controlled by the injection rate, viscosity, pressure, etc. of each injection port. This is illustrated schematically in FIG. 11. As there illustrated, in a molding process, a first material "A" having a first set of properties, for example high impact strength, desirable particularly in a leading edge 110 of a component generally 112, may be injected through a first injection port or conduit 114. A second material, "B", which may have a second set of properties, for example, a medium impact strength, may be injected through a second injection port or conduit 116 to form a portion, such as a trailing edge 118 of the component 112 that may require less impact strength. A third material, "C," which may have a third set of properties, for example, a low impact strength, may be injected through a third injection conduit 120 to form another portion, such as a top surface 122 that may require the lowest impact strength. As illustrated, the different materials may blend with one another, as illustrated by transition regions AC and AB. The degree of blending may be controlled, for example, by varying the injection speed, viscosity, etc. For example, lower viscosity materials may tend to blend more readily than higher viscosity materials over a given cure time. In the aspect illustrated in FIG. 11, the component 112 may be of uniform thickness, but of course as will now be appreciated, both the thickness and the material of construction may be varied along the component 112.

In yet another aspect of the disclosure illustrated in FIG. 11, one or more of the transition regions AC and/or AB may optionally be directly injected or filled with a blend of the adjoining materials, in this case, a first transition blend of material A and B and a second transition blend of material A and material C. The first transition blend of material A and B may be injected or filled through an injection port 124 as illustrated. The second transition blend of material A and C may be injected or filled through an injection port 126 as illustrated. Pre-blending adjoining materials and directly injecting them into a transition zone in this way may provide certain advantages, including providing for greater certainty of composition of the transition region, tailoring the composition of the transition region to a blend that might not result from in situ blending of adjacent materials, and providing for smoother transition from one region of material to the next. Indeed, multiple injection ports each injecting a different blend of transition materials between regions may permit a more gradual transition from one region to the next. By way of example, Region A may be injected with 100% material A and region B may be injected with 100% material B. The transition region AB may be divided into different transition zones, each in communication with a separate injection port injecting a different blend of components A and B.

This concept is illustrated schematically in FIG. 12. As there shown, the component, generally 112, may comprise, for example five regions or zones, I-V. These zones may not have clear demarcation between them particularly if smooth blending of material is desired; thus the dotted lines illustrated for separating the zones are illustrative only. As illustrated, zone I may comprise 100% of material A, which may, for example, be a composite material having a first set of properties. Zone V may comprise 100% of material B, which may, for example, be a composite material having a second set of properties. Zones II, III, and IV may comprise transition zones between zones I and V. Zone II may be a blend of material A and B that may be predominantly A, in this example, 75% A by weight and 25% B by weight. Zone IV may comprise a blend of material A and B that may be predominantly material B, in this example, 75% by weight B and 25% by weight A. Zone III may, as in this example be an equal blend of 50% A and B by weight. Each of zones I-V may be in an injection mold (not shown), with each zone being in communication with its own injection port, also not shown, for injecting the precise blend and quantity of material desired.

This aspect of the disclosure, wherein different regions of a component may be fabricated of different materials, may have wide application both within and outside of the aerospace industry. For example, it is known to use composite materials to fabricate golf club shafts of varying stiffness, by using a different stiffness material for different shafts. But using the techniques described herein, it is now possible to impart different stiffness to different regions of a golf club shaft. In this way, a shaft of uniform diameter from below the grip to above the club head may be achieved, permitting, for example, lower diameter shafts all along the length of the club to minimize air resistance during the swing. Similarly, a baseball bat may be fabricated of a composite material of varying strength and/or stiffness, for example, using a material of greater flexibility between the handle and the barrel of the bat and using a material of greater density in the barrel. Use of the varying properties of materials in fabricating other components is now also achievable according to the present disclosure.

Another aspect of the disclosure is illustrated in FIG. 13. In this aspect, a jet engine having a deflector generally 130 may comprise one or more deflector members 132 that may be rotationally or pivotally mounted to the engine, as will now be described.

As has been previously discussed, bird strikes generally occur at or below 10,000 feet AGL and more commonly at or below 3,000 feet AGL. At these altitudes, the aircraft is not at cruising altitude, and thus not flying at cruising speed, rather, is typically flying well below cruising speed. Typical cruising air speed for long-distance commercial passenger flights is 475-500 knots (878-926 km/h; 546-575 mph).

For an average-sized commercial jetliner with typical fuel and payload, the "takeoff speed" is around 130-160 knots, or about 150 to 200 miles per hour. The landing speed is more or less the same, usually a few knots slower. Thus, there is a transitional period between takeoff and cruising speed and between cruising speed and landing speed that transitions the aircraft between the lower takeoff speeds of about 150-200 miles per hour and the upper cruising speed of about 575 miles per hour and back to the lower landing speeds of around 150-200 miles per hour. Once the aircraft reaches a safe cruising altitude, say 30,000 feet, or cruising speed associated with such altitudes, a bird strike deflector is no longer needed, as birds are not able to reach such altitudes.

This aspect of flight speed and/or altitude may be advantageously employed with a bird strike deflector that is able to transition from a deployed orientation when the aircraft is at lower speeds and/or lower altitudes to a retracted orientation when the aircraft is at cruising speeds and/or altitudes. The deployed configuration of a bird strike deflector, generally 10, may be illustrated with reference to FIG. 1. In this aspect of the disclosure, the deflector may comprise one or more deflector members 12 that may be connected to a jet engine at their aft end at an attachment point 60.

The attachment point 60 may provide for rotational or pivotal attachment of the deflector member 12 to the engine. Referring to FIG. 13, the attachment point 60 may permit pivotal attachment, and may include a spring-loaded pivot pin, a mainspring, or other device 138 configured to provide pivotal, biased connection of a rotatable/pivotal deflector member 132 to the engine cowling, frame, attachment ring, and/or member or other structural support, all schematically illustrated by element 134 of FIG. 13.

The deflector members 12, 132 may also be rotationally or pivotally attached at their fore ends to a central hub 14 at fore end attachment points 61. One or both of the aft attachment points 60 and/or the fore attachment points 61 may be spring loaded or otherwise configured to resist rotation until the aircraft reaches a predetermined speed, at which point the velocity of the incoming air may be sufficient to turn the deflector members 12 from a deployed orientation as illustrated in FIG. 1 and in FIG. 13 in dotted lines to a retracted position as illustrated by deflector members 132 in FIG. 13, thereby permitting greater air intake to the jet engine and greater flying efficiency.

In another aspect, the deflector member(s) 132 may be configured with a mechanism to actuate the deflector member(s) from a deployed position as illustrated by members 12 in FIG. 1 and the dotted lines of FIG. 13 to a retracted position as illustrated by deflector members 132 in FIG. 13. Such a mechanism may be actuated from the cockpit once the aircraft reaches an acceptable altitude. In this aspect, an attachment ring such as 16 of FIG. 1 may be rotatably mounted to the engine, with the deflector members 132 being rotatably mounted to the attachment ring 16 such that rotation of the attachment ring, as illustrated by arrow R in FIG. 13, may cause the deflector members 132 to pivot substantially as illustrated in FIG. 13.

Only some of the deflector members 12, 132 are illustrated in FIG. 13 for simplicity.

It may be advantageous to mount one or both ends of the deflector member 12 off center, as illustrated in FIG. 1 at attachment point 60. Such a mounting orientation may impart a moment about the attachment point 60, further enabling the rotational retraction of the spring loaded or otherwise biased deflector member 12. This aspect is illustrated schematically in FIG. 14, which shows a deployed deflector member 12 in cross section, such as taken along lines C-C of FIG. 2, mounted via a spring-loaded pin 138 within a mounting detent 140 in the engine cowling, frame, or attachment ring or other structural member 134 of the engine.

As illustrated, the spring-loaded pin 138 may be positioned off center with respect to the deflector member 12 such that incoming air, illustrated by arrows I, will tend to create a moment M about the pivot point, for example, the spring-loaded pin 138, by virtue of the greater surface area of deflector member 12 on one side of the pivot point relative to the other side. At sufficient air speed, this moment may overcome the biasing forces of the spring-loaded pin 138 or otherwise biased connection, which may in turn cause the deflector member 12 to rotate in the direction shown, assuming a retracted position such as illustrated by dotted line deflector member 132.

The deflector member 12 illustrated in FIG. 14 may have, as illustrated, a relatively narrow edge 142 that may transition to a wider opposing edge 144, to assist in splitting air flowing past the deflector member 12, as previously described. The deflector 12 may also have a trough, groove, or channel surface 82 as previously described.

As illustrated in FIGS. 13 and 14, as the aircraft reaches a speed that exceeds takeoff or landing speed of about 150-200 mph, such as cruising speed or speeds above about 200 mph, the deflector member(s) 12 may rotate such that their narrower edges 142 face the incoming air I, thereby creating much wider distances D between adjacent deflector members 12. While this distance D would likely be too wide to prevent ingestion of even large birds, such ingestion will not typically occur at the higher cruising altitudes as previously discussed.

While the deflector of the present disclosure has been illustrated mounted to a jet engine having a circular air inlet opening, consistent with many commercial aircraft, it will now be appreciated that the deflector as described herein may be mounted to jet engines of any inlet configuration, including without limitation four-sided, D-shaped, triangular, or oval shaped air inlets. The deflector 10 may, in such applications, be sized and configured to conform to the shape of the air inlet opening, for example, by configuring the aft end of the ribs, spokes, or vanes to be spaced around the air inlet opening and/or by providing an attachment ring sized and configured to conform to the size and shape of the air inlet opening.

Although the deflector of the present disclosure has been described primarily with respect to jet engines for aircraft, it is intended that the disclosure and appended claims may apply to other applications, e.g., use of the deflector with gas turbines for power generation, with propeller engines of aircraft, and generally with any air inlet where ingestion of birds and other airborne debris is to be avoided.

It will now also be appreciated that deflectors such as disclosed herein may be modified to be retractable with respect to the jet engines to which they may be mounted, to permit retraction of the deflector once the airplane has reached an altitude above which bird strikes are highly unlikely, e.g., 10,000 feet AGL or higher. Such retraction may be achieved by disposing the rib, spoke, or vane members within the cowling of the engine and including a pusher/retractor mechanism that can motivate the ribs, spokes or vanes into position and retract them into a stowed position within the engine cowling. In such embodiment, the central hub could be dispensed with, and the ribs, spokes or vanes could be designed with fore ends that come close together and optionally interconnect upon deployment. Such a retraction mechanism might utilize the attachment ring as a motivator for the ribs, spokes, or vanes, which may be pivotally connected to the attachment ring, and may include retraction motors, outer hatch doors, and connections such as are known in the art, e.g., for retracting landing gear, wing features, and the like. Such a mechanism might further include straight, or in the case of spiral shaped ribs, spokes, or vanes, spiral grooves within the engine cowling to direct and retain the ribs, spokes, or vanes in the proper alignment upon deployment.

One aspect of a retractable deflector of the present disclosure is illustrated in FIG. 15. In this aspect, a retractable deflector, generally 150, may be mounted proximate the air inlet 155 of a structure, generally 160. The structure 160 may be, for example, a jet engine, a gas turbine, an internal combustion engine, or any other structure having an air intake region that may be subject to ingestion of foreign matter.

In one aspect, the structure 160 may comprise a jet engine having an air inlet cowl 151. The air inlet cowl may be fabricated of metal, such as aluminum and/or its alloys, and/or a composite material such as described herein. The air inlet cowl 151 may include an outer wall 157 and an inner wall 159. Between the outer wall 157 and inner wall 159 may be an internal space 158 that may be of sufficient size and shape to accept one or more deflector members 152 in a stowed position. As illustrated, when the deflector member(s) 152 are in a stowed position, they may reside entirely inboard of the inner wall 159 of the air inlet cowl 151, providing all or substantially all of the available area of the air inlet 155 for receiving incoming air. It may be advantageous to employ the retractable deflector 150 in a stowed position, for example, in the case of a jet engine, after the aircraft has reached a comfortable cruising altitude and/or cruising speed and/or after it has reached an altitude at which ingestion of airborne matter, such as birds, is unlikely, generally above about 10,000 feet AGL.

As will be subsequently described, one or more of the stowed deflector members 152 may be deployed across a portion of the air inlet 155 to prevent ingestion of airborne matter of a predetermined size into the air inlet 155. In this regard, as will be subsequently described, several deployed deflector members 152A may overlap one another upon deployment, leaving relatively small uncovered areas 155A of the air inlet 155 for air intake. Additional air intake may be achieved through the use of air inlet openings 156, which shall also be subsequently described.

Although FIG. 15 illustrates four deployed deflector members 152A, (and for simplicity three stowed deflector members 152) it will be readily appreciated that any convenient number of deflector members 152, 152A may be employed, depending on the size of the deflector member(s) 152, 152A and/or diameter or area of the air inlet 155. As will be readily appreciated, the larger and/or more numerous are the deflector member(s) 152, 152A, the smaller will be the uncovered areas 155A of the air inlet 155.

Although the deflector members, 152, 152A as illustrated in FIG. 15, may have a curvilinear shape, which may widen from the outer end 170 to the inner end 172, and/or may thicken from the inner end 172 to the outer end 170 as illustrated in FIG. 15A, it will also be appreciated that any convenient configuration for the deflector member(s) 152, 152A may be employed. For example, the deflector member(s) 152, 152A may grow thinner from the inner end 172 to the outer end 170, and/or may, as illustrated relative to member 12 of FIG. 2, grow narrower from the inner end to the outer end. Thus, the deflector member(s) 152, 152A may have other shapes, including but not limited to shapes such as disclosed herein, for example, as rib, vane, or spoke deflector members 12 of FIGS. 1-7 herein, or the shapes of comparable components as disclosed in FIGS. 8-14 herein. Indeed, the retractable deflector 150 may comprise one or more deflector member(s) 152, 152A having a different shape or configuration relative to other deflector member(s) 152, 152A. The deflector member(s) 152, 152A of FIGS. 15 and 15A (as well as other similar structures described herein) are illustrative, schematic, and not necessarily to scale.

As illustrated, one or more of the deflector members 152, 152A may be attached to the structure 160, for example a jet engine, to the air inlet cowl 151 and/or to a structural member therein at an attachment point 153 thereof. The attachment point 153 of the deflector member(s) 152, 152A may be a pivotal attachment that may enable the deflector member(s) 152, 152A to pivot, turn, rotate, or otherwise transition from a stowed position as illustrated by dotted line deflector member(s) 152 to a deployed position as illustrated by solid line deflector member(s) 152A. The stowed deflector member(s) 152 may transition to a deployed position by passing through a slot, hatch, hole, or other access 151A formed in the inner wall 159 of the air inlet cowl 151, as best seen in FIG. 15A. As there illustrated, the access 151A may have one or more angled or contoured sides or edges 151B that may assist in deploying the deflector member(s) 152A along the desired transition path. Such angled or contoured sides or edges 151A may extend into the internal space 158 from the inner wall 158A of the air inlet cowl 151, may compliment and/or be part of a guide member 168 (subsequently discussed), and/or may be integrally formed with the air inlet cowl 151 and/or may comprise separate elements. Such angled or contoured sides or edges 151B may be shaped to substantially correspond to the shape or contour of that portion of the deflector member(s) 152, 152A passing through the access 151A.

The transition of the deflector member(s) 152 from a stowed position to a deployed deflector 152A position may be along a path such as that schematically illustrated by double headed arrow W in FIG. 15. Transition path W may be in only one plane of view, i.e., may be rotational in only one plane. In this aspect, the retractable deflector 150 may open and close with substantial similarity to a camera lens aperture, and may include one or more geared motors, such as illustrated and described in U.S. Pat. No. 8,285,136 or European patent application publication number EP1841212 A1, both incorporated by reference in their entirety herein, that may drive the deflector member(s) 152, 152A between a stowed and deployed position, respectively, for example utilizing a power transmission device that may move the deflector member(s) 152 along or within a guide member, hole, slot, or groove, and through the air inlet cowl 151 into the air inlet 155, such as through access 151A of FIG. 15A.

In one aspect, the retractable deflector 150 may employ, for example a motivator 162, such as a diaphragm ring to which may be pivotally connected one or more deflector members 152, 152A at their attachment point 153. Such motivator may further include, for example, a linkage rod to assist in motivating the deflector member(s) 152, 152A along a generally radial path similar that used to open and close a camera lens aperture. The motivator or diaphragm ring 162 may be motivated by a geared motor mechanism, generally 164, that may include a drive gear 165 that may engage the diaphragm ring 162 and may be driven by a drive motor 166. The drive motor 166 may be mounted within the internal space 158 of the air inlet cowl, for example, by mounting the drive motor 166 to an internal wall 158A thereof as illustrated. The deflector member(s) 152 may be urged into a deployed position, for example, by causing the drive motor 166 to drive the drive gear 165, thereby motivating the diaphragm ring 162 in the direction of arrow Y in FIG. 15. As illustrated in FIGS. 15 and 15A, the geared drive motor 166 and drive gear 165 or other motivating mechanism may reside inboard of the air inlet cowl inner wall 159.

The drive gear 165 may comprise a plurality of gears and/or may ride in a gear path in the air inlet cowl internal wall 158A. In another aspect, the drive gear 165 may ride in a gear path in the diaphragm ring. As illustrated in FIG. 15A, the air inlet cowl 151 may include one or more outer accesses 220 that may comprise a door, hatch, or other access permitting access to the drive motor 166, drive gear 165, and other components of the retractable deflector 150 for maintenance, repair, inspection, etc.

As illustrated in FIG. 15, one or more of the deflector member(s) 152, 152A may include one or more air inlet openings 156 substantially as described with respect to other aspects of the disclosure herein. The air inlet openings 156 of FIG. 15 may be sized and shaped such that when one or more deflector member(s) 152, 152A overlap in a deployed position, one or more of their respective air inlet openings may substantially align as illustrated by aligned air inlet openings 156A.

As further illustrated in FIG. 15, the diaphragm ring 162 may comprise an inner wall having an inner diameter 210 and an outer wall having an outer diameter 212. As illustrated in FIG. 15A, the inner wall 210 (and/or outer wall 212) may be slidably retained within the air inlet cowl 151 by a retaining member 214. As illustrated, the inner wall 210 (and/or outer wall 212) may include a key 215 or retaining flange to slidably retain the diaphragm ring 162 within the retaining member 214. The diaphragm ring 162 may further include one or more bearings 216 to provide smooth rotation of the diaphragm ring 162 about the air inlet cowl. The retaining member 214 may be a separate component or may be integrally formed with the air inlet cowl 151. Although only one retaining member 214 is shown, and only the inner wall 210 is illustrated as having a key 215 that may be retained by the retaining member 214, it will be understood that additional retaining members 214 may be used, for example, to retain the outer wall 212, in which case the outer wall 212 may likewise include a key 215.

One or more guide members 168 may be positioned within, and/or fixed to, and/or integrally formed with, the air inlet cowl 151. Such guide member(s) 168 may be angled and/or curved to complement the shape and/or transitional paths, such as transitional paths W, L, CW, and CC (subsequently described), of the deflector member(s) 152, 152A and/or may be contoured to compliment the contour(s) of the deflector member(s) 152, 152(A), such that as the deflector member(s) 152, 152A slide past the guide member 168, the deflector member(s) 152, 152A may be urged into and/or retained in a deployed orientation as illustrated by deflector member(s) 152A. In the aspect of the disclosure illustrated in FIG. 15, two guide members 168 are illustrated as engaging one deployed deflector member 152A. Additional guide members 168A may be used to assist in returning, retaining, and/or stowing the deflector member(s) 152 in a stowed position.

It may be advantageous, when employing more than one guide member 168, to provide adequate spacing between adjacent guide members 168 such that a deflector member 152A adjacent to the deflector member 152A that is urged and/or retained by the adjacent guide members 168 may pass between adjacent guide members 168 when being retracted into a stowed position. Of course, other configurations for the guide member(s) 168 are possible, including integrally forming guide members 168 with the air inlet cowl 151 and/or using a smaller or more elongated guide member 168 that may engage a smaller or larger portion of the deflector member(s) 152A than illustrated.

Optionally, alternatively, or additionally, the retractable deflector 150 may include mechanisms permitting the transition path of the guide member(s) 152, 152A to comprise a directional component generally parallel to the direction of incoming air, or normal to the page of FIG. 15, i.e., generally along the path of double-headed arrow L-L in FIG. 15A. Also, imparting a directional component tending to orient the deflector member(s) 152, 152A into an orientation comprising a trailing edge 167 and a leading edge 169 may be achieved. In this aspect, the deflector member(s) 152 i.e., may transition from a stowed position within the air inlet cowl 151 to a deployed position substantially as illustrated in FIGS. 2 and 15A, such that the deflector member(s) 152 (element 12 in FIG. 2) achieve a fore and aft orientation, as well as a radially disposed orientation over at least a portion of the air inlet 155. Such a transition may be achieved using any convenient mechanism for the purpose.

In one aspect, illustrated in FIGS. 16-18, the guide member(s) 168 may comprise a generally curvilinear surface or angled wall 179 that may urge the deflector member(s) 152, 152A radially inwardly, i.e., from the position of stowed deflector member 152 residing within the air inlet cowl 151 to that of deployed deflector member 152A, lying at least partially across the air inlet 155. It may here be noted that other structures, including guide pins, grooves, slots, and the like may also serve the same purpose as the guide member(s) 168. Also, as previously noted, angled, flared, beveled, or otherwise contoured walls 151B to the air inlet cowl access 151A may assist in orienting the deflector member(s) 152 as they transition from their stowed position to the deployed position of deflector member(s) 152A.

The guide member(s) 168 may also comprise a generally inclined, curved, flared, or otherwise contoured directional surface 180. This directional surface 180 may assist in urging one or more deflector members 152 along a transition path having a directional component generally parallel to the direction of incoming air, i.e., normal to the air inlet 155. This directional surface 180 may also comprise, when viewed on end as in FIGS. 18 and 19, a bevel having an outer portion 182 transitioning to an inner portion 184 that may be beveled in a generally inboard direction and may assist in urging, turning, or twisting a deploying deflector member 152A into an orientation comprising, as in FIG. 18, an outboard or leading edge 169 and an inboard or trailing edge 167.

Another aspect of the guide member 168, as viewed from the right side of FIG. 16, is illustrated by FIG. 19. In this aspect, the directional surface may be beveled in a generally outboard direction, which may cause the deflector member 152A to be oriented as illustrated, with the leading edge 169 being inboard, and the trailing edge 167 being outboard.

When a guide member 168 such as illustrated in FIGS. 16-19 is used, it may be advantageous for the attachment point 153 to comprise a ball-and-socket joint, such as illustrated schematically in FIG. 15A, or similar universal/pivotal connection that may permit pivoting and/or rotation by the deflector member(s) 152, 152A in multiple directions or planes, i.e., permitting yaw, pitch, and/or roll of the deflector member(s) 152, 152A relative to the air inlet cowl 151. When such a universal joint, i.e., a ball-in-socket or other universally pivotal connection is used for the attachment point 153, for example in combination with a guide member 168 such as disclosed herein, the deflector member(s) 152, 152A may be motivated along a transition path having one or several directional components.

For example, the guide member(s) 168 may guide the deflector member(s) 152, 152A along a transition path having a first directional component, the first directional component being directed generally radially from/toward the air inlet cowl inner wall 159 toward/from the air inlet 155 as illustrated by double-arrow W in FIGS. 15 and 15A. In this aspect, the guide member(s) may be complimented or replaced with a slot 222 formed in or passing through the diaphragm ring 162 and through the inner wall 210. The slot may comprise a path substantially the same as the transition path W. The slot 222 may receive a pin or flange 224 that may extend from a surface of the deflector member(s) 152, 152A and may be integrally formed therewith. The guide pin or flange 224 may be elongated, to enable it to remain within the slot 222 through the entire path of the slot 222, particularly where the deflector member(s) 152, 152A are motivated longitudinally in the L-L direction as described herein.

The guide member(s) 168 may further guide the deflector member(s) 152, 152A along a transition path having a second directional component, the second directional component being directed generally longitudinally, i.e., in and out of the air inlet cowl 151, substantially parallel to the direction of incoming air entering the air inlet 11, 155, as illustrated by the double headed-arrow L-L in FIGS. 2 and 15A.

The guide member(s) 168 may further guide the deflector member(s) 152, 152A along a transition path having a third directional component, as illustrated by the arrows CW and CC of FIGS. 15A, 18, and 19. This third directional component may be directed generally rotationally, imparting, for example, a generally clockwise rotation to the deflector member(s) 152, 152A about the pivotal connection 153 into the page of FIG. 15A as illustrated by the arrow CW, and/or imparting, for example, a generally counterclockwise rotation of the deflector member(s) 152, 152A out of the page of FIG. 15A, thereby, in either case, imparting the deflector member(s) 152, 152A with a leading edge 169 and a trailing edge 167. The retractable deflector 150 may employ any one of the first, second, or third directional components, all of them, or any combination of them, for example may employ the first, or the second, or the third, or the first and section, or the first and third, or the second and third, or the first, second, and third, directional components.

As also illustrated in FIGS. 16-19, the guide member(s) 168 may comprise a retaining portion 186 that may, as illustrated in FIGS. 18 and 19, assist in retaining deployed deflector member(s) 152A in a deployed position, for example, by capturing, slidably retaining, or otherwise holding the deployed member 152 securely in a deployed orientation. A similar retaining portion 186 may be used with guide member(s) 168A to retain stowed deflector member(s) in a stowed position.

It should here be noted that the deflector members 152, 152A may engage one or more other deflector members 152, 152A when deployed for structural rigidity. For example, as illustrated in FIG. 15, one or more of the deployed deflector members 152A may overlap another deployed deflector member, such as an adjacent deflector member 152A, resulting in an overlapping region(s), 154, illustrated in cross hatch in one of the overlapping regions 154A. These overlapping regions 154 may engage one another upon deployment and/or upon stowing of the retractable deflector 150, and may thus provide enhanced structural integrity of the retractable deflector 150. In this aspect of the disclosure, the need for a central hub such as element 14 of FIG. 1 may be dispensed with, as sufficient central stability may be imparted by the overlapping nature of the adjacent deflector members 152A upon deployment. As further illustrated in FIGS. 15 and 20, the overlapping regions 154 may optionally be arrested in their deployment relative to one another by an arrest member, 190, which may be a pin, detent, wall, or other member that may arrest the transitional motion of one or more of the deploying deflector member(s) 152 upon full deployment.

FIG. 20 illustrates an arrest member 190 as illustrated in FIG. 15 in a cross sectional view taken along lines F-F. As there illustrated, adjacent deflector members 152A may overlap in overlapping regions 154 which may partially or completely touch, depending on the contours of the deflector members 152A. The arrest member 190 may include a slot 191 and/or overhang 192 that may assist in retaining the upper or outer deflector member 152A in close contact with the lower or inner deflector member 152A upon deployment, providing further structural support. The arrest member 190 may be sized, shaped, and positioned so as to arrest the movement of a deploying deflector member 152A in any and all directional components described herein. Although the arrest member 190 of FIG. 20 is illustrated as being positioned on the upper side of the lower of two overlapping deflector member 152A, the arrest member(s) 190 may optionally or additionally be positioned on the side of the deflector member(s) 152, 152A, and/or on lower side of the upper of two overlapping deflector member 152A. In addition to, or in place of arrest members 190 being deployed on the deflector member(s) 152A, similar structures may be employed on the air inlet cowl, for example, at the access opening through which the deflector member(s) 152A may pass upon deployment, This written description uses examples to disclose the invention, including the best mode, and also to enable any person of ordinary skill in the art to practice the invention, including making and using any devices or systems and performing any incorporated methods. The steps recited in the accompanying method claims need not be taken in the recited order, where other orders of conducting the steps to achieve the desired result would be readily apparent to those of ordinary skill in the art. The patentable scope of the invention is defined by the claims, and may include other examples that occur to those of ordinary skill in the art. Such other examples are intended to be within the scope of the claims if they have structural elements that do not differ from the literal language of the claims or if they include equivalent structural elements with insubstantial differences from the literal languages of the claims.

What is claimed:

1. An aircraft component comprising a wing, a tail section, an engine nacelle, an air inlet cowl, a windshield, an air inlet deflector, or a fuselage, the aircraft component comprising an outer skin, the outer skin comprising a fore end region and an aft end region relative to an intended direction of an airstream or airborne matter impacted by the outer skin, the fore end region presenting a first angle of incidence, and the aft end region presenting a second angle of incidence, the first angle of incidence being more direct relative to the intended direction than the second angle of incidence, wherein the fore end region of the outer skin comprises a first thickness relative to the intended direction, and the aft end region of the outer skin comprises a second thickness relative to the intended direction, and the first thickness is greater than the second thickness, and wherein the fore end region of the outer skin further comprises a first impact strength, and the aft region of the outer skin comprises a second impact strength, and the first impact strength is greater than the second impact strength, and wherein the outer skin further comprises a fiber-reinforced composite material.

2. The aircraft component of claim 1 wherein the first angle of incidence is greater than the second angle of incidence.

3. The aircraft component of claim 1 wherein the outer skin comprises a molded component.

4. The aircraft component of claim 3 wherein the molded component comprises a fiber-reinforced material.

5. The aircraft component of claim 1 comprising a varying impact strength portion between the fore end region and the aft end region.

6. The aircraft component of claim 5 wherein the varying impact strength portion comprises impact strengths that vary continuously from the fore end region to the aft end region.

7. The aircraft component of claim 1 wherein the outer skin comprises a molded unitary piece.

8. An aircraft component comprising a wing, a tail section, an engine nacelle, an air inlet cowl, a windshield, an air inlet deflector, or a fuselage, the aircraft component comprising an outer skin, the outer skin comprising a fore end region and an aft end region relative to an intended direction of an airstream or airborne matter impacted by the outer skin, the fore end region presenting a first angle of incidence, and the aft end region presenting a second angle of incidence, the first angle of incidence being more direct relative to the intended direction than the second angle of incidence, wherein the fore end region of the outer skin comprises a first impact strength, and the aft end region of the outer skin comprises a second impact strength, and the first impact strength is greater than the second impact strength, and wherein the outer skin further comprises a fiber-reinforced composite material.

9. The aircraft component of claim 8 wherein the fore end region of the outer skin comprises a first composite material comprising the first impact strength, and the aft end region comprises a second composite material comprising the second impact strength.

10. The aircraft component of claim 8 wherein the fiber-reinforced composite material comprises a plastic, a polymer, or a thermoplastic.

11. The aircraft component of claim 8 wherein the fiber-reinforced composite material comprises carbon, Kevlar, Twaron, aluminum, or glass fibers.

12. The aircraft component of claim 8 wherein the fiber-reinforced composite material comprises epoxy, polyester, vinyl ester, or nylon.

13. The aircraft component of claim 8 wherein the outer skin comprises a molded unitary piece.

14. The aircraft component of claim 13 wherein the outer skin comprises an injection molded unitary piece.

15. The aircraft component of claim 8 wherein the fore end region of the outer skin comprises a first fiber-reinforced composite material, and the aft end region of the outer skin comprises a second fiber-reinforced composite material.

16. A method of fabricating an aircraft component comprising molding an outer skin of a wing, a tail section, an engine nacelle, an air inlet cowl, a windshield, an air inlet deflector, or a fuselage, the outer skin comprising a molded, unitary piece, the outer skin further comprising a fiber-reinforced composite material and a fore end region and an aft end region relative to an intended direction of an airstream or airborne matter impacted by the outer skin, the fore end region presenting a first angle of incidence, and the aft end region presenting a second angle of incidence, the first angle of incidence being more direct relative to the intended direction than the second angle of incidence, the method comprising molding the fore end region with a first impact strength, and molding the aft end region with a second impact strength, wherein the first impact strength is greater than the second impact strength.

17. The method of claim 16 wherein the first impact strength comprises molding the fore end region with a first thickness relative to the intended direction, the second impact strength comprises molding the aft end region with a second thickness relative to the intended direction, and wherein the first thickness is greater than the second thickness.

18. The method of claim 16 wherein the first impact strength comprises molding the fore end region with a first impact strength material having the first impact strength, the second impact strength comprises molding the aft end region with a second impact strength material having the second impact strength.

* * * * *